US010545256B2

(12) United States Patent
Chaney

(10) Patent No.: US 10,545,256 B2
(45) Date of Patent: Jan. 28, 2020

(54) APPARATUSES AND METHODS FOR DETERMINING PERMITTIVITY IN DOWNHOLE LOCATIONS

(71) Applicant: Reeves Wireline Technologies Limited, Leicestershire (GB)

(72) Inventor: Darren Chaney, Leicestershire (GB)

(73) Assignee: Reeves Wireline Technology Limited (GB)

(*) Notice: Subject to any disclaimer, the term of this patent is extended or adjusted under 35 U.S.C. 154(b) by 81 days.

(21) Appl. No.: 15/291,287

(22) Filed: Oct. 12, 2016

(65) Prior Publication Data
US 2017/0108608 A1  Apr. 20, 2017

(30) Foreign Application Priority Data

Oct. 16, 2015 (GB) .................................. 1518353.6

(51) Int. Cl.
G01V 3/30 (2006.01)
G01V 3/02 (2006.01)

(52) U.S. Cl.
CPC ...................................... G01V 3/02 (2013.01)

(58) Field of Classification Search
CPC ............................................................ G01V 3/30
USPC ................................................................. 324/338
See application file for complete search history.

(56) References Cited

U.S. PATENT DOCUMENTS

| 4,511,842 A | 4/1985 | Moran et al. |
| 4,511,843 A | 4/1985 | Thoraval |
| 5,132,623 A | 7/1992 | De et al. |
| 6,150,822 A | 11/2000 | Hong et al. |
| 2003/0017637 A1 | 1/2003 | Kennedy et al. |

FOREIGN PATENT DOCUMENTS

| EP | 0187583 A2 | 7/1986 |
| EP | 1956395 A1 | 8/2008 |
| EP | 2110688 A1 | 10/2009 |

OTHER PUBLICATIONS

Search Report received in co-pending GB Application No. GB1518353.6, dated Jun. 23, 2016, 2—pgs.

Primary Examiner — Lam S Nguyen
(74) Attorney, Agent, or Firm — Blank Rome, LLP

(57) ABSTRACT

Apparatus (57, 58) for determining permittivity in a downhole location comprises a sensor (57) including an elongate conducting line (62) supported on or adjacent a first side of a dielectric substrate (61). The sensor (57) also includes at least one conducting ground element (26, 27) that is spaced from the conducting line (62), the conducting line (62) being capable of juxtaposition to a downhole borehole wall (12). The apparatus further includes connected respectively to spaced locations along the conducting line at least two terminals (31, 32; 63, 64) of a vector network analyser (57b) that is capable of detecting one or more signal reflection characteristics whereby when the sensor (57) is juxtaposed to a borehole wall (12) the vector network analyser (57b) generates one or more signals that are processable to indicate the relative permittivity of rock (39) in which the borehole is formed.

50 Claims, 9 Drawing Sheets

APPARATUSES AND METHODS FOR DETERMINING PERMITTIVITY IN DOWNHOLE LOCATIONS

FIELD OF THE DISCLOSURE

The subject matter of the present disclosure relates to apparatuses and methods for determining permittivity in downhole locations. The disclosed subject matter also relates to logs and log data generated using the methods and apparatuses described herein.

BACKGROUND OF THE DISCLOSURE

As is well known, prospecting for minerals of commercial or other value (including but not limited to hydrocarbons in liquid or gaseous form; water e.g. in aquifers; and various solids used e.g. as fuels, ores or in manufacturing) is economically an extremely important activity. For various reasons those wishing to extract such minerals from below the surface of the ground or the floor of an ocean need to acquire as much information as possible about both the potential commercial worth of the minerals in a geological formation and also any difficulties that may arise in the extraction of the minerals to surface locations at which they may be used.

For this reason over many decades techniques of logging of subterranean formations have developed for the purpose of establishing, with as much accuracy as possible, information as outlined above both before mineral extraction activities commence and also, increasingly frequently, while they are taking place.

Broadly stated, logging involves inserting a logging tool including a section sometimes called a "sonde" into a borehole or other feature penetrating a formation under investigation; and in the majority of cases using the sonde to energize the material of the rock, etc., surrounding the borehole in some way. The sonde or another tool associated with it that is capable of detecting energy is intended then to receive emitted energy that has passed through the various components in the rock before being recorded by the logging tool.

Such passage of the energy alters its character. Knowledge of the attributes of the emitted energy and that detected after passage through the rock may reveal considerable information about the chemistry, concentration, quantity and a host of other characteristics of minerals in the vicinity of the borehole, as well as geological aspects that influence the ease with which the target mineral material may be extracted to a surface location.

Logging techniques are employed throughout the mining industry, and also in particular in the oil and gas industries. The disclosed subject matter is of benefit in logging activities potentially in all kinds of mining and especially in the logging of reserves of oil and gas.

In the logging of oil, coal and gas fields (including fields combined with rock types such as shales) specific problems can arise. Broadly stated, this is because it is helpful to consider a geological formation, surrounding a borehole, that typically is porous and that contains a hydrocarbon-containing fluid such as oil or gas or (commonly) a mixture of fluids only one component of which is of commercial value.

This leads to various complications associated with determining geological attributes of the oil or gas field in question. In consequence, a wide variety of logging methods has been developed over the years. The logging techniques exploit physical and chemical properties of a formation usually through the use of a logging tool or sonde that as outlined above is lowered into a borehole (that typically is, but need not be, a wellbore) formed in the formation by drilling.

Typically, as noted, the tool sends energy into the formation and detects the energy returned to it that has been altered in some way by the formation. The nature of any such alteration can be processed into electrical signals that are then used to generate logs (i.e. graphical or tabular representations containing much data about the formation in question).

One specific aspect of logging that has developed in recent years is the practice of logging a borehole while it is being drilled. This technique, which is sometimes referred to as "logging while drilling" (or "LWD"), can for example permit the direction of drilling to be altered such that the borehole extends for a maximal distance through a region of the geological formation that is believed to be rich in minerals of value. Another example of an LWD technique involves using the log data to help steer the drill head that forms the borehole so as to avoid regions of rock that are likely to be problematic in terms of borehole stability or other adverse factors in mineral recovery.

The disclosed subject matter is potentially of use in, and pertains to, all aspects of logging as described herein.

One characteristic of formations surrounding boreholes that is of potential interest to petrophysicists and others charged with the task of assessing downhole environments is the relative permittivity or dielectric constant of the rock formation.

One reason this quantity is of interest is that its value is distinctive depending on the fluid contained in the pores of the rock. This is of potential benefit in determining whether the rock pores contain water, oil, gas or a mixture of these fluids.

In particular it is known that the dielectric constant of liquid hydrocarbons, especially oil, is in the range 1-3; that of rock is in the range 4-10; and that of water is in the range 56-80. An accurate measure of dielectric constant can provide a direct indication of the make-up of fluids (including fluid mixtures) in the rock pores. Different mixtures of fluids can influence the dielectric constant to a variable extent; and the measured value also may be influenced by the rock type.

This is an advantage of a dielectric constant measurement over for example a resistivity measurement that, while widely used in logging technologies, can be ambiguous when seeking to distinguish between rock-borne water and rock-borne hydrocarbons. This is particularly the case when the water in the formation is of low or zero salinity, although the problems of resistivity measurement ambiguity diminish with increasing salinity of any water in the pores of the rock.

Despite the apparent advantages of dielectric constant measurements they have not been widely used in logging techniques. It is believed that the primary reason for this is a lack of faith on the part of analysts and petrophysicists in the reliability of subterranean dielectric constant measurements.

This in turn is because existing equipment for measuring dielectric constant values in downhole locations (i.e. locations in boreholes as referred to above) is known to suffer from poor depth of penetration characteristics. As a result the emitted energy passes only a relatively short distance into the rock surrounding a borehole. As a consequence the dielectric constant measurement does not give an acceptably comprehensive picture of the conditions prevailing in the rock.

Known designs of logging tool used for measuring dielectric constant employ typically a transmitter of electromagnetic energy and a receiver antenna that is spaced from the transmitter along the logging tool (which in nearly all cases is an elongate cylinder of perhaps about 75 mm diameter and several meters in length). Although the emitted energy is intended to pass into the rock before returning to the receiver antenna in practice a significant percentage of it travels parallel to the logging tool without appreciably penetrating the rock. That which passes into the rock is usually of limited use because it returns to the receiver antenna as reflected energy. The point of reflection is not known and therefore it is not known how far the energy has travelled after leaving the transmitter antenna before being received at the receiver antenna.

The energy that travels parallel to the logging tool gives an accurate indication of the dielectric constant of the materials through which it has passed. Such a signal however is essentially wasted as it does not imply on receipt at the antenna any information about the permittivity of the rock at any location except very close to the borehole. The returned energy therefore may convey as much information about the borehole surface layer which may be composed of mudcake lining the borehole and/or near-borehole fluid mixing and/or borehole rugosity as information about rock-borne fluids. Since mudcake forms from chemicals intentionally introduced into the borehole during drilling, information about its make-up is of limited benefit.

Moreover the signals derived from such directly transmitted energy and signals derived from energy that has passed through rock can interfere unacceptably with one another, distorting the output of the receiver antenna and making it hard to process and interpret electronically.

A further problem with existing antenna-based dielectric constant measuring logging tools is that they suffer from unwanted reflections of emitted signals. Such reflections can occur with respect to the opposite side of the logging tool to that at which investigations are required. The reflected signals too tend to interfere destructively with the desired signals.

U.S. Pat. No. 7,376,514 describes variants on the basic antenna type of logging tool. This publication observes that the dielectric constant in fluid-filled rock can be generated as a complex number. U.S. Pat. No. 7,376,514 describes the measuring of the complex dielectric constant value at three distinct frequencies, and an associated processing technique.

It is believed that an antenna used to couple electromagnetic energy at three separate frequencies for the purpose of determining complex dielectric constant values can only function by resonating relatively weakly at at least two of the frequencies. This conclusion derives from the well-known fact that an antenna used to detect electromagnetic radiation is tuned to couple strongly only at a single frequency, with less efficient detection at harmonics of the tuned frequency and considerably less efficient detection (or, more probably, non-existent detection) at non-harmonic frequencies.

In view of the foregoing there is a need for improvements in the detection of dielectric constant values of rock formations surrounding subterranean boreholes.

SUMMARY OF THE DISCLOSURE

According to the present disclosure in a first, broad aspect there is provided apparatus for determining permittivity in a downhole location comprising a sensor constituted as a waveguide including an elongate conducting line supported on or adjacent a first side of a dielectric substrate and also having at least a first conducting ground element that is spaced from the conducting line, the conducting line being capable of juxtaposition to a downhole borehole wall and the apparatus further including a measuring device that is capable of detecting one or more signal reflection and/or transmission characteristics relating to electrical current and/or electrical voltage whereby in use of the sensor when juxtaposed to a borehole wall the measuring apparatus measures one or more signals that are processable to indicate the relative permittivity of the borehole environment.

The apparatus of the present disclosure thus advantageously abandons prior art dielectric constant measuring techniques that rely on the use of transmitting and receiving antennae in favor of transmission line-based apparatus that is capable of microwave transmission. The inventor has found that such apparatus gives rise to a better constrained transmission field than the described prior art apparatuses. This in turn helps to minimize unwanted reflections.

The elimination of an antenna-receiver arrangement means that the sensor pad may be made shorter than in the prior art. This in turn improves the ability of the logging tool to conform to the dimensions of the downhole environment.

In preferred embodiments of the present disclosure, the measuring device includes one or more selected from the list comprising an impedance analyzer, a voltage measuring device, a current measuring device, a vector network analyzer, or a scalar network analyzer.

The measuring device when in the form of a network analyzer such as a scalar network analyzer or preferably a vector network analyzer is capable of energizing the sensor and further preferably is capable of detecting one or more transmission and/or reflection characteristics, especially voltage, current, the S-parameter characteristics, Z-Parameter characteristics, Y-Parameter characteristics, h-Parameter characteristics, ABCD-Parameter characteristics or T-parameter characteristics. Upon energizing the sensor or when otherwise operative when juxtaposed to a borehole wall the network analyzer generates one or more signals that are processable to indicate the relative permittivity of rock in which the borehole is formed.

Furthermore the S-Parameter or other characteristics, as listed above, of an electronic system relate to its signal reflectivity and transmission, and are detectable essentially regardless of the frequency of transmission through the system. Consequently advantageously the measuring device in preferred embodiments of the present disclosure is capable of energizing the sensor in a range of frequencies.

In other words in contrast to the resonant antennae of the prior art the apparatus of the present disclosure functions over a wide frequency range with almost no variation in signal detection efficiency. The apparatus of the present disclosure thus may be considered as a broadband device.

As is known, a port of a network analyzer includes two nodes or terminals. The pair of terminals are considered a port when the current flowing into one terminal of the port is equal to the current flowing out of the other terminal of the port. It is understood that terminology which mentions a ground terminal is consistent with this definition. Several designs of network analyzer include at least two ports of this kind, whereby the analyzer is able to analyze the reflection and transmission characteristics of the device or system under test in at least one direction of transmission of test signals. All such features optionally are within the scope of the disclosed subject matter as claimed herein.

Preferably the sensor is selected from the list comprising a non-flat stripline, a non-flat coplanar waveguide or a non-flat microstrip. For the avoidance of doubt a non-flat sensor includes within its scope a range of sensor types, geometries and shapes. The use of a non-flat sensor provides advantages in terms of the ability of the sensor to conform to downhole (borehole) geometries and shapes. The preferred form of "non-flat" stripline, coplanar waveguide or microstrip is one including a convexly curved outer surface at least on the side that is intended to be juxtaposed to a borehole wall.

Thus a range of transmission line types is suitable for forming the sensor of the apparatus of the present disclosure. The coplanar waveguide type is the presently most preferred. Coplanar waveguides conventionally are flat laminae but in the apparatus of the present disclosure a new form of coplanar waveguide is proposed in which the plane that is common to the elements of the waveguide is convexly curved, as mentioned above.

Further preferably the sensor includes a conducting line on a side, especially a non-flat side, of a dielectric core material that includes a conducting earth plane supported on or adjacent a reverse side. As noted the inclusion of at least one non-flat side of the sensor, being the side that supports the conducting line, confers advantages in terms of the ability of the sensor of the present disclosure to conform to the interior of a borehole against which it is juxtaposed.

Also preferably the conducting earth plane extends around respective, opposed parts, especially faces, of the sensor to flank each elongate edge of the conducting line and thereby define a respective predefined gap between the edges of the conducting line and the earth plane. The conducting line preferably is centrally positioned on the said non-flat side of the core material.

The width of the central conducting line electrode and the size of the gap between conducting line and earth plane have been found to influence the depth of penetration of the sensing electric field into the rock surrounding the borehole. Although a non-flat front face to the sensor is used to ensure conformity of the sensor pad with the borehole wall, a non-flat reverse side to the sensor has been found to increase the depth of penetration of the sensor signal into the rock surrounding the borehole to a certain extent.

Conveniently the apparatus may include a plurality of said sensors that are each capable of investigating the borehole environment to a differing depths of investigation, the apparatus further including one or more measuring devices such as but not limited to network analyzers that are connectable to measure transmission/reflection characteristics corresponding to the said differing depths.

This opens the possibility of operating the sensor(s) forming part of the apparatus in two modes, being respective deep and shallow modes; and generating data corresponding to the two modes. From these it is possible to derive compensated dielectric constant measurements that take account of the effect of a parasitic (in terms of the measurement) layer of material surrounding the borehole which may take the form of mudcake and/or near borehole fluid mixing and/or borehole rugosity on the measured dielectric constant values. The term "compensated" in this context is known to the person of skill in the art and therefore does not require further explanation.

In preferred embodiments of the present disclosure the sensor is or includes a coplanar waveguide having a further conducting ground plane or element supported on a second side of the dielectric substrate lying opposite the first side.

Preferably the further conducting ground plane element is conductingly connected at each side to a pair of said first conducting ground plane elements.

Further preferably the conducting line tapers at each end by way of a tapered portion between a transmission line portion and a respective terminal portion, respective terminals of the measuring device being connected to the respective terminal portions.

As is well known to electronics engineers an electronic network can, depending on its design, reflect a significant amount of the electrical energy that is provided for the purpose of powering it. A vector network analyzer is a device that among other things is capable of measuring the amount and phase of reflected and/or transmitted energy in such a network.

The amount of reflected energy depends on several aspects of the sensor and the surrounding material. The sensor should be designed so that when held in air, its impedance is closely matched to a reference impedance, usually the impedance of the network analyzer. The introduction of an external dielectric material will then change the impedance of the sensor causing an increased reflection to be registered by the network analyzer. It is important to design the sensor such that reflections are a result of the introduction of the external dielectric material and not a result of badly designed electrodes.

Unwanted reflections can also arise as a result of an abrupt change in the size or orientation of the conducting electrodes that make up the waveguide. To avoid such unwanted reflections between the relatively small connections that are characteristic of the network analyzer and the relatively large main central section of the waveguide of the sensor, a tapered or graded connecting region is used. This taper is chosen such that the impedance at each point along the taper is maintained at or close to a reference impedance, that is usually the impedance of the network analyzer. The taper may then be uniform or non-uniform depending on the geometry of the sensor in order to achieve a constant impedance.

More generally the reflection characteristic can be optimized by forming each tapered portion as or including a balun, i.e. a device that converts between a balanced signal and an unbalanced signal. Designs of balun are known to the person of skill in the art.

Advantageously the inventor has found that the conformity of the sensor with the borehole can be improved if the first side of the dielectric substrate is convexly curved, and in particular part-elliptical or part-circular. By "part-elliptical" is meant a shape that is part of an ellipse; and by "part-circular" is meant a shape that is part of a circle. However in other embodiments of the present disclosure, it is believed to be possible to adopt profiles for the first side that are combinations of e.g. circular and elliptical curves, or combinations of other functions that generate curves. All such variants are within the scope of the claims hereof.

Yet further benefits in terms of the depth of signal penetration have been found to derive from use of a sensor in which the second side of the dielectric substrate is convexly curved, and in particular also is part-elliptical or part-circular (or otherwise curved, as indicated) in profile.

In preferred embodiments of the present disclosure, the measuring device is connected to one or more programmable devices programmed to generate log information derived from the output of the measuring device. Such log information may be in numerical, tabular, graphical, voltage or other processable, storable or transmissible form within the scope of the present disclosure.

Advantages in terms of variability of the vertical resolution can be achieved by employing plural sensors exhibiting differing vertical resolution characteristics, and processing the signals from them in order to achieve desired vertical resolution effects.

In turn this permits accurate resolution matching of logs produced using the apparatus of the present disclosure, using per se known techniques that rely on the generation of plural logs of a length of borehole using logging tools having differing vertical resolution characteristics.

For the avoidance of doubt, in some embodiments of the present disclosure some or all of the electronic and electrical components constituting the measuring device may be supported by or incorporated in the sensor.

In a second broad aspect, the present disclosure relates to a logging tool including apparatus according to the present disclosure as defined herein.

Such a logging tool optionally includes at least one moveable arm that is secured at one end to the logging tool and supports the sensor at its opposite end. Moveable deployment arms that press sensor pads into contact with the wall of a borehole are per se well known in the logging tool art. The sensor forming part of the apparatus of the present disclosure advantageously may be formed as a pad that is suitable for deployment in this manner. The moveable arm may adopt any of a range of per se known designs that are suitable for the purpose of pressing a sensor into contact with a borehole wall.

In a logging tool according to the present disclosure, preferably the measuring device, e.g. network analyzer is supported in or by the logging tool. In this regard the measuring device may be formed as a series of distributed electronic components that are supported at spaced locations in the logging tool. As noted this may include distribution of some or all the parts of the measuring device in the sensor.

In other embodiments of the present disclosure, however, the measuring device may be formed as a module or unit that can be installed in or connected to the logging tool as an integrated whole.

The logging tool of the present disclosure as defined herein optionally may be operatively connected to a programmable device that is programmed to generate one or more logs based on signals measured by the measuring device. Such logs may take a wide range of numerical, tabular, or graphical forms; and may be presented or displayed by way of a wide range of media, including electronic display devices or print.

The programmable device when present may be spaced from the logging tool, and may be connected thereto by wireline.

Alternatively the programmable device may be supported in or on the logging tool.

Regardless of the precise location of the programmable device relative to the logging tool preferably the logging tool optionally may include a plurality of apparatuses each according to the present disclosure as defined herein.

Further preferably the logging tool may include an outer periphery and the plurality of apparatuses is supported at intervals about the outer periphery. Such a plurality of apparatuses can beneficially be supported on a plurality of deployable arms or similar deployment members. Each such member may be capable of moving the sensors of the respective apparatuses between a stowed position and a deployed, protruding position. If desired a common measuring device may be provided for such a plurality of sensors; or a plurality of measuring devices may be provided. The measuring devices of such a plurality need not necessarily be of identical design, although this is possible within the scope of the present disclosure.

Such an arrangement can give rise to an array of deployed sensors that can log the region of rock surrounding the logging tool. The sensors can be retracted e.g. during transportation of the logging tool between a surface location and a downhole location. Such a means of operating a logging tool is known per se in the logging tool art.

The deployable arms can adopt any of a range of designs as aforesaid. It is not essential that the deployable arms are all the same, although in practical embodiments of the present disclosure this is likely to be the case.

For the avoidance of doubt however it is reiterated that a highly useful logging tool may include a single apparatus, as defined herein, that does not need to be mounted moveably relative to the remainder of the logging tool.

The logging tool of the present disclosure as defined herein may, also within the scope of the present disclosure, be supported on and operatively connected to wireline, which as is known in the art may convey power and commands to the logging tool and may upload to e.g. a surface-located computer data and signals generated by the logging tool.

The logging tool may in some other embodiments of the present disclosure include an on-board power source. Such a logging tool does not need to be connected to wireline in order to be operational, and instead functions in an essentially autonomous manner following insertion into a borehole. Typically a logging tool that includes an on-board power source also includes a memory device that records log data and signals during logging operations. The log data are uploaded to a surface computer following the completion of logging operations and the retrieval of the logging tool from the borehole According to a further aspect of the present disclosure there is provided a method of determining permittivity in a downhole location comprising (i) effecting juxtaposition to a downhole borehole wall of a sensor forming part of an apparatus according to any of Claims 1 to 21 hereof or forming part of a logging tool according to any of Claims 22 to 32 hereof; (ii) causing the measuring device to detect one or more reflection and/or transmission characteristics, especially the voltage, current, S-parameter characteristics, Z-Parameter characteristics, Y-Parameter characteristics, h-Parameter characteristics, ABCD-Parameter characteristics or T-parameter characteristics, of the sensor using the measuring device and (iii) generating in the measuring device one or more signals that can be interpreted to indicate the relative permittivity of the rock in which the borehole is formed.

For the avoidance of doubt, "borehole wall" as referred to herein could be a reference to e.g. the rock in which the borehole is formed, and/or a borehole surface layer which may be mudcake and/or near borehole fluid mixtures.

As is well known, in practice borehole walls may be rugose. The aforementioned definitions include smooth and rugose borehole walls. Borehole rugosity may give rise to particular borehole wall effects resulting from e.g. the presence of one or more fluids in cavities that are sometimes characteristic of borehole rugosity. The term "borehole wall" as used herein further includes such effects.

Preferably the one or more signals are or include signals representative of the characteristic impedance of the sensor of the apparatus according to the present disclosure as defined herein when forming part of a two or three-dielectric system under test (SUT) in which the sensor defines a first layer; a borehole surface layer is defined as an optional second layer and rock surrounding a borehole defines a further (second or third, as appropriate) layer. There exists a solvable relationship between the characteristic impedance of the sensor in such systems and the dielectric constant of the rock. Systems of greater or lesser complexity than the two- and three-dielectric systems described in detail herein may be analyzed using the logging tool and method of the present disclosure.

Preferably the method includes the step of determining the filling factors of the layers of a multi-layer dielectric system. In this regard it is known in the art to define a respective filling factor (e.g. filling factors $q_1$, $q_2$ and $q_3$ in a three-layer system) for each layer of the multi-layer dielectric system constituting the system under test that is formed when the logging tool of the present disclosure is deployed in a downhole location.

Such a model lends itself to being solved for real data using a programmable device such as a computer.

Preferred embodiments of the method of the present disclosure include the step of determining, based on signals indicative of the S-parameters of the multi-layer (typically a two or three-layer) the effective dielectric constant $\varepsilon_{\mathit{eff}}$ of the system and using the expression $\varepsilon_{\mathit{eff}} = \varepsilon_1 q_1 + \varepsilon_2 q_2 + \varepsilon_3 q_3$ in which $\varepsilon_1$ is the dielectric constant of the sensor of the apparatus of any of Claims 1 to 22 to establish, as necessary, $\varepsilon_2$ which is the dielectric constant of the borehole surface layer; and $\varepsilon_3$ which is the dielectric constant of the rock formation dielectric layer.

If it is required to analyze a two-dielectric layer system the foregoing expression may be employed in a form summing just two of the three terms indicated. The term $\varepsilon_1 q_1$ is known as it relates to characteristics of the sensor and these can be measured before it is used. The model may be solved for $\varepsilon_3 q_3$, and if it represents a three-layer system, $\varepsilon_2 q_2$ as well ($q_2$ having a value of zero in a two-layer system). In the three-layer case, it is helpful for any sensor arrangement to be capable of investigating the surroundings of the borehole at two depths on investigation. A technique for achieving this is described herein.

The method of the present disclosure lends itself to performance using a programmable device such as a digital computer. To this end the method preferably includes the step of causing a programmable device to generate one or more logs based on signals generated in the measuring device which as noted in preferred embodiments of the present disclosure is a (scalar or vector, as appropriate) network analyzer. Such logs may be in digital, numerical, tabular, and graphical or image form and in accordance with the method of the present disclosure may selectively be saved, printed, stored, transmitted and/or displayed.

The method also optionally includes the step of causing movement of a logging tool along the borehole.

Various methods of deploying and withdrawing a logging tool are known, including so-called "shuttling" of the tool inside a protective component to a downhole location followed by withdrawal of the exposed tool e.g. supported on drill pipe; and wireline deployment in which the logging tool is conveyed supported on wireline and typically but not necessarily withdrawn through a process of winding the wireline, with the logging tool attached to its downhole end, onto a winding drum. As a generality, the present disclosure includes within its scope all suitable deployment and withdrawal methods. An especially preferred embodiment of the method of the present disclosure includes supporting the logging tool using, and connected via, wireline.

According to one advantage, the method of the present disclosure can benefit drilling operations. In this regard optionally the method of the present disclosure may be carried out during drilling of a borehole. The data generated, transmitted or recorded by the sensor of the present disclosure may provide guidance to the drillers on the nature of the borehole environment and be used in the determination of, among other things, the direction in which the borehole is drilled. In such a mode of operation a logging tool according to the present disclosure may be supported on or by a drillhead.

LWD is an important subject in oil and gas field exploitation, and it is believed that the apparatuses, logging tools and methods of the present disclosure can bring about improvements in the effectiveness of this discipline.

In preferred aspects of the present disclosure, the measuring device electrically energizes the remainder of the sensor, preferably in a range of frequencies.

For the avoidance of doubt references herein to a measuring device "measuring" one or more signals may if the context so requires include the broader concepts of the measuring device either (i) generating signals itself; or (ii) detecting signals generated in or by other components of the apparatus of the present disclosure. The ascribing of values to such signals may occur in the measuring device itself, in another part of the apparatus of the present disclosure or in further apparatus that is operatively connected to the present disclosure.

In addition to the foregoing, the disclosed subject matter is considered to reside in a programmable device that is programmed to carry out the steps of the method of any of Claims 34 to 42 or 44 to 48 hereof other than Steps (i) to (iii). Steps (i) to (iii) are not suitable for performance by a programmable device per se, although these steps can be effected by apparatus connected to or under the control of a programmable device otherwise falling within the scope of the present disclosure.

Similarly, the subject matter of the present disclosure resides in a drill string including apparatus according to any of Claims 1 to 22 hereof or a logging tool according to any of Claims 23 to 33 hereof.

Furthermore, the subject matter of the present disclosure extends to log data generated using apparatus according to any of Claims 1 to 22 hereof; a logging tool according to any of Claims 23 to 33 hereof; and/or a method according to any of Claims 34 to 48 hereof.

DETAILED DESCRIPTION

There now follows a description of preferred embodiments of the present disclosure, by way of non-limiting example, with reference being made to the accompanying figures. Referring to the figures, FIG. 1 illustrates some problems that can arise in the operation of prior art downhole permittivity measuring apparatuses.

Figure 1:
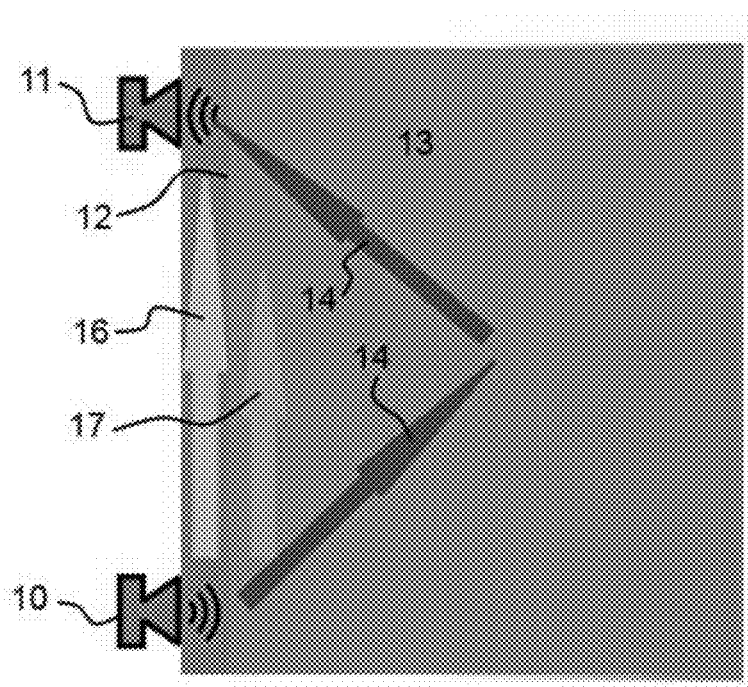
FIG. 1 is a schematic representation of a prior art electromagnetic transmitter-receiver permittivity measuring apparatus, showing some types of unwanted signal propagation mode.

In FIG. 1 a prior art permittivity measuring apparatus is represented in simplified form by transmitter 10 and receiver 11 that in practice would be supported spaced from one another along the surface of an elongate cylindrical logging tool. The transmitter 10 and receiver 11, which take the form of tuned antennae, are positioned adjacent one side 12 of the wall of a subterranean borehole formed in rock 13 such that the transmitter 10 transmits electromagnetic energy into the rock formation and the receiver 11 receives energy that has passed through the rock. Various electronic and programmable components that form part of the logging tool permit the generation of suitable electromagnetic waveforms and their receipt via the receiver 11.

The aim of the apparatus in FIG. 1 is to transmit energy from the transmitter 10 propagating through the rock formation 13, to be received at the receiver 11. In order to calculate a dielectric constant from measured data it must be assumed that the signal will travel along the path of known distance (i.e. the transmitter-receiver separation distance).

Some proportion of the signal may propagate within the surface layer 12 along path 16, some may travel slightly deeper within the rock 13 along path 17, and some may travel very deep into to formation and be reflected along path 14.

The total received signal will represent some unknown weighted average of all these propagation modes. Without knowing the precise nature of each of these propagation modes it would be very difficult to isolate the contribution from the rock alone.

In this context references to "depth" are to the depth into the rock from the borehole that the transmitted energy signal extends. The term "depth" is also used in logging to refer to the depth along the borehole at which logging takes place. The context generally indicates which meaning of "depth" is being referred to.

Another significant problem associated with the apparatus of FIG. 1 relates to the overall length of the apparatus.

The transmitter antenna 10 and receiver antenna 11 are usually spaced apart from one another a considerable distance along the logging tool that supports them. Many embodiments of such a time-of-flight apparatus incorporate several transmitters and receivers on the same pad.

The long length of the pad of the time-of-flight type of logging tool means that the pad stand-off from the borehole wall may become large in highly deviated, rugose, caved, or otherwise non-uniform boreholes. This may compromise the measurement quality if the effects of the near borehole environment cannot be accounted for.

For the foregoing reasons the prior art antenna-based permittivity logging tools do not perform as well as might be desired. The disclosed subject matter seeks to apply an entirely different approach to the logging of permittivity values in subterranean formations. The inventor has found that the philosophy of the present disclosure considerably improves the frequency range performance of permittivity logging apparatuses compared with the prior art described above, while providing for potentially better conformity of the sensor apparatus with borehole walls (including the walls of rugose boreholes).

The basic principle of the present disclosure is to replace the antennae of FIG. 1 by a transmission line-based apparatus that operates at microwave wavelengths and has been found beneficially to measure relative permittivity over a broad range of frequencies. The apparatus of the present disclosure at a fundamental level therefore is believed to offer significant improvements over the prior art devices which typically only operate at a few discrete frequencies.

A transmission line-based sensor furthermore is much smaller than the prior art sensor apparatus of FIG. 1 and therefore may achieve better wall contact by reason of presenting a smaller footprint that can contact the borehole wall with a reduced need for unacceptable levels of standoff.

Figure 2A:
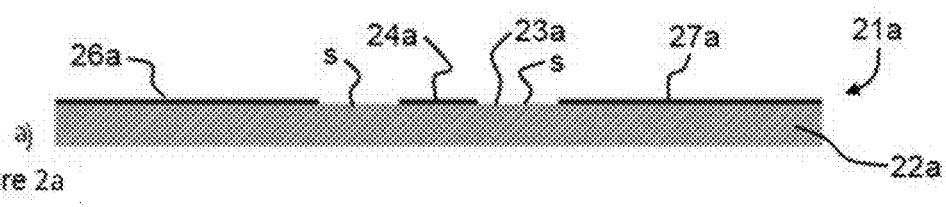
FIGS. 2a to 2c show in schematic, cross-sectional view three designs of coplanar waveguide (CPW) that are helpful for explaining the principles of the present disclosure.
Figure 2B:
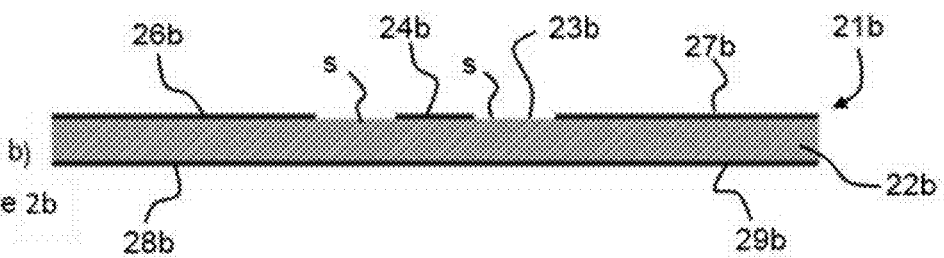
Figure 2C:
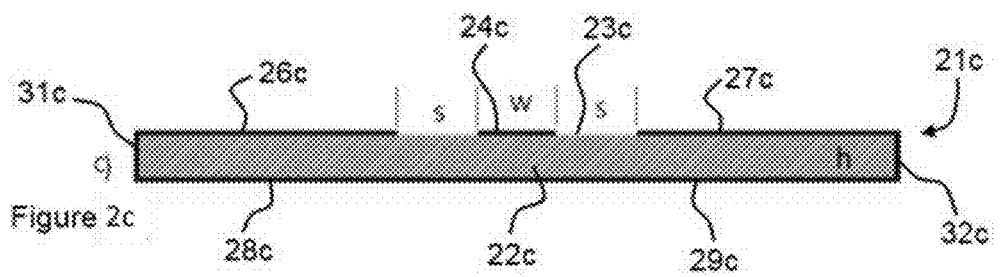

For the purpose of illustrating some principles underlying the present disclosure, three designs of transmission line in the form of coplanar waveguides 21 are shown in FIGS. 2a to 2c. The disclosed subject matter however is not limited to the use of CPW sensors. On the contrary a range of microwave transmission line sensor arrangements, including CPW types and e.g. striplines and microstrips (both of which terms are known to the person of skill in the art), are possible within the scope of the present disclosure. Furthermore as described below the preferred geometries of the sensors that form part of the present disclosure are non-flat and hence are optimized in terms of their ability to conform to a variety of borehole diameters. For this reason the flat CPW sensors of FIGS. 2a, 2b, and 2c are not representative of practical embodiments of the present disclosure.

A conventional CPW design 21a shown in FIG. 2a comprises an essentially, typically rectangular when viewed in plan, laminar dielectric substrate 22a made from a printed circuit board material such as a glass epoxy having one, as illustrated upper, side 23a partially coated with a conducting material such as copper. The copper defines a central, straight, elongate transmission line 24a extending from one end of the CPW 21a to the other. Coplanar waveguides are predominantly used to transport microwave signals between one point and another and certain prior art CPW designs have been used e.g. in laboratories to sense the dielectric constants of objects or systems against which they are placed in contact. A CPW requires energizing in one of the ways described below in order to generate signals that can be processed to generate dielectric constant information.

If as is anticipated the CPW is intended to be used in a harsh environment such as within a borehole the basic structure may be "ruggedized" e.g. through the use of more robust materials than those conventionally employed; and through the incorporation of e.g. wear plates and other features that lengthen the service lives of the parts of the sensors when operating downhole. The theoretical sensor designs shown in cross section in FIGS. 2a to 2c, and the practical designs of FIGS. 7-9 omit such features for ease of illustration, but in productionized versions would be likely to include such aspects.

In FIG. 2a the transmission line 24a is flanked along each elongate edge by a respective earth plane 26a, 27a. Each earth plane 26a, 27a defines a straight edge that is spaced from the transmission line 24a by a gap s via which the material of the substrate 22a is exposed. The earth planes 26a, 27a extend from the edge of the adjacent gap s to the outer extremity of the substrate 22a.

A variant of the basic CPW design is the conductor-backed CPW (CBCPW) 21b shown in cross sectional view in FIG. 2b. In FIG. 2b the design of the CPW is in many respects the same as that of the CPW 21a of FIG. 2a, with the substrate 22b, upper side 23b, transmission line 24b and earth planes 26b, 27b adopting the same designs as the counterpart components of FIG. 2a. In addition the opposite side 28b of the substrate 22a to upper side 23a is coated over its entirety by an additional earth plane electrode 29b made from a conductor such as copper.

In like manner to the FIG. 2a embodiment the CBCPW of FIG. 2b may be used to sense relative permittivity values.

A further variant 21c on the CPW design is shown in FIG. 2c, in which the reference numerals represent counterparts of the components visible in e.g. FIG. 2b. The FIG. 2c CPW is modified compared with the FIG. 2b version in that the backing electrode 29c is connected at either side of the substrate 22 by way of connector electrodes 31c, 32c to the respective upwardly adjacent earth plane 26c, 27c.

FIG. 2c also shows the width w of the transmission line/conducting track 24, the gap s that extends on either side of the transmission line 24 and the height h of the substrate 22. The CPW's of FIGS. 2a and 2b may have their key dimensions similarly characterized, although such data are with the exception of the dimension s omitted from FIGS. 3a and 3b for ease of illustration.

Figure 3:
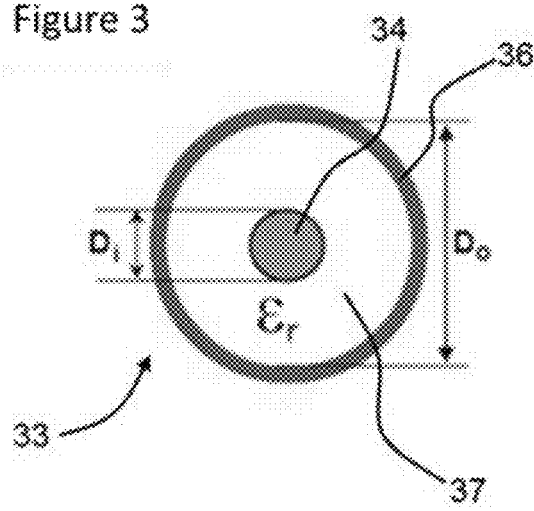
FIG. 3 shows in schematic, cross-sectional view a coaxial cable that is useful for understanding the relationship between impedance and dielectric constant in CPW designs.
Figure 4:
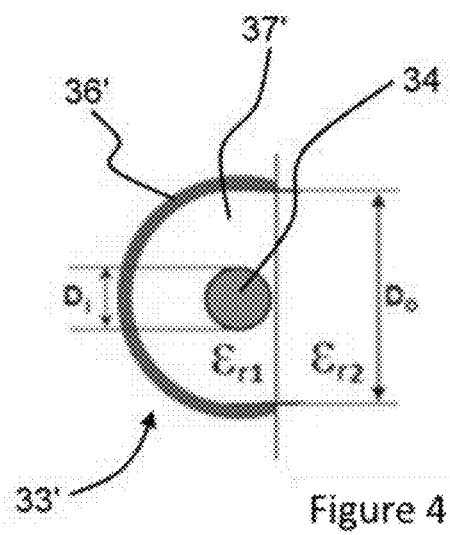
FIG. 4 shows in schematic, cross-sectional view a truncated coaxial cable that further is useful for explanatory purposes.

FIGS. 3 and 4 illustrate, with reference to a coaxial cable model, how a CPW may be used to measure the dielectric constant of a material. A coaxial cable 33 as shown in cross-section in FIG. 3 consists of an inner conductor core 34 of diameter $D_i$, and an outer conductor shield 36 of diameter $D_O$ separated by a dielectric filler 37 of constant $\varepsilon$. The impedance of a coaxial cable is given by $$Z_{coax} = \frac{1}{2\pi}\sqrt{\frac{\mu}{\varepsilon}} \ln\left(\frac{D_o}{D_i}\right). \tag{1}$$

The impedance of the coaxial cable $Z_{coax}$ is only dependent on the fixed cable dimensions $D_i$ and $D_o$, and the dielectric constant of the filler material $\varepsilon$. The dielectric permeability $\mu = \mu_0 \mu_r$ has negligible influence since $\mu_r$ is usually close to unity in most non-metallic materials.

Truncating the coaxial cable 33 to the form 33' shown in FIG. 4 gives rise to an element having the conducting core 34 and modified conductor shield 36' and filler 37' as illustrated. The apparent dielectric constant of this arrangement 33' is modified by whatever dielectric material ($\varepsilon_{r2}$) it is placed against. This in turn will influence the characteristic impedance of the cable.

Further changing the cross-sectional shape of the shaved coaxial cable generates the geometry of the conductor backed CPW of FIG. 2c. The impedance of such a CBCPW is given by:

$$Z_{CBCPW} = \sqrt{\frac{\mu_0}{4\varepsilon_0 \varepsilon_r}} \left( \frac{K(k_1)}{K(k'_1)} + \frac{K(k_3)}{K(k'_3)} \right)^{-1} \tag{2}$$

where K(k) are the complete Elliptical integrals of the first kind and the values for k, k', $k_1$ and $k'_1$ are parameters that are only dependent on the constituent materials and geometry of the CPW; $\mu_0$ is the magnetic permeability of free space; $\varepsilon_0$ is the permittivity of free space; and $\varepsilon_r$ is the effective relative permittivity of the CPW. Hence, if the impedance of the CPW can be measured it can be related to the effective dielectric constant of the system including the CPW.

Although in theory any of the sensor designs of FIGS. 2a to 2c may be employed to determine the relative permittivity of a rock formation surrounding a borehole, in practice the geometries shown in those figures are unlikely to be successful in a downhole environment. This is not least because the flat sensor surfaces constituted by the features 23, 24, 26, 27 of the sensors generally fail to conform to the profile of a borehole. This is partly because of the curved nature of a borehole wall, and partly because of rugosity, deviation and other causes of non-uniformity of the borehole cross-section.

Figure 5:
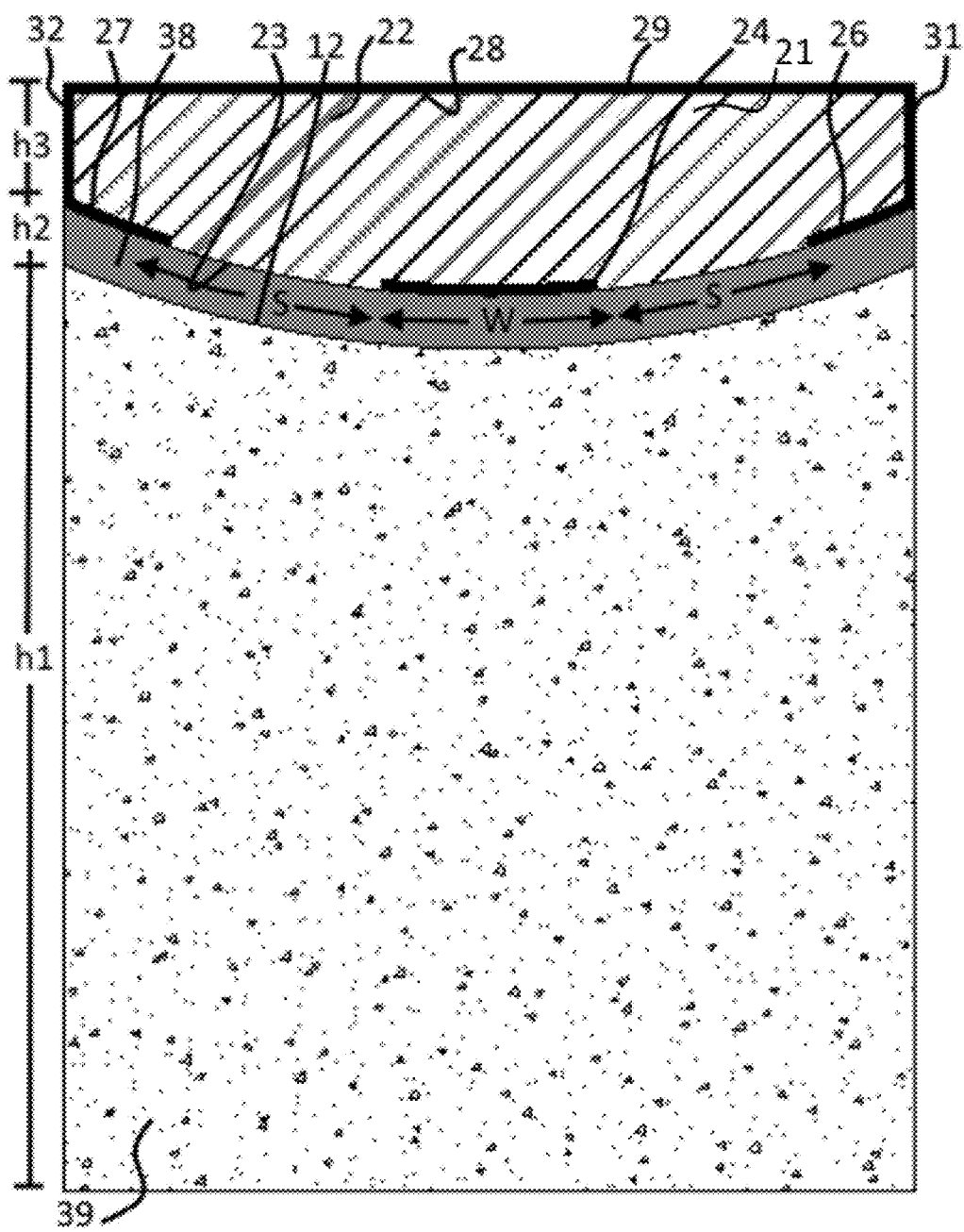
FIG. 5 shows in schematic, cross-sectional view a three-layer system including a sensor comprising one form of non-flat CPW according to the present disclosure.

FIG. 5 illustrates in schematic, cross-sectional view the use of one form of the CBCPW 21 of FIG. 2c that is modified in accordance with the present disclosure in order to provide good conformity with the dimensions and shape of a range of borehole sizes.

The CBCPW 21 comprises a substrate 22 that as illustrated is of approximately D-shaped cross section, with the rectilinear back surface 28 of the D shape supporting a conductive backing layer 29; the convexly curved front surface 23 supporting a central, curved-profile conducting line 24 and spaced, flanking, curved-profile earth plane elements 26, 27; and the straight ends of the substrate supporting flat connector electrodes 31, 32.

In FIG. 5 the CBCPW 21 is pressed by the parts of a logging tool 57 (see FIG. 6), as further described below, into contact with the borehole wall 23 which as stated repeatedly herein may or may not include a borehole surface layer 38 lining a borehole formed in rock 39. In the following analysis the thickness of the rock 39 is modelled as the dimension $h_1$; the thickness of the mudcake 38 as $h_2$; and an effective thickness (which may be calculated using standard conformal mapping techniques) of the CBCPW sensor 21 as $h_3$.

As mentioned and as illustrated in FIG. 5 the profile of the front 23 of the substrate 22, and hence of the conducting line 24 and earth planes 26, 27, is arcuate. As illustrated therefore the sensor 21 conforms well to the arcuate shape of a borehole wall 12. As a result the standoff is minimal or, as shown in FIG. 5, zero. As a consequence the system constituted by the sensor 22, the mudcake and/or near borehole fluid mixing and/or borehole rugosity layer 38 (if present) and the rock 39 can be analysed as a two- or three-layer dielectric system. Such a system is susceptible to mathematical treatment in order to derive dielectric constant values for the system, as further described herein.

In addition the sensor 22 of FIG. 5 is of more compact dimensions, and in particular is shorter in the elongate direction of the borehole, than the prior art antenna-based sensor of FIG. 1. As a consequence the sensor 22 accommodates e.g. borehole direction changes, and rugosity, better than the prior art arrangement without either becoming stuck in the borehole or exhibiting unacceptable standoff. This again means that the analysis of the system including the sensor 22 can take place as though the system is the three-layer system illustrated.

The sensor 22 in use is connected to a network analyzer as described further below and energized, again as further described below. Reflected electrical energy, and in particular the S-Parameter signals generated in the network analyzer (that in preferred embodiments of the present disclosure is a vector network analyzer as described), then can be processed in a programmable device such as a computer connected to the network analyzer in order to provide dielectric constant information.

The following describes a per se known basis for the calculation of filling factors $q_1$, $q_2$, $q_3$ of a three-layer dielectric system in which the respective layers are labelled as "layer 1", "layer 2" and "layer 3". These layers correspond to the layers 22, 38 and 39 of FIG. 5.

The expression for the characteristic impedance of a three-layer CPW when all three layers are filled with air can be written as:

$$Z = \frac{1}{cC_t^a} \quad (3)$$

Where $C_t^a$ is the total capacitance of the air filled structure (the superscript a denotes air-filled) and c is the speed of light in a vacuum. Assuming that the boundary between dielectric layers in FIG. 5 can be considered to be magnetic walls the total capacitance of the system is the sum of the partial capacitances from each layer. The effective dielectric constant of the three layer system can then be approximated by the expression:

$$\varepsilon_{eff} = \varepsilon_1 q_1 + \varepsilon_2 q_2 + \varepsilon_3 q_3 \quad (4)$$

where the n-th layer has the dielectric constant $\varepsilon_n$ and a filling factor $q_n$. The characteristic impedance of the system in the presence of the dielectric materials in the three layers is then calculated from the relation:

$$Z_0 = \frac{Z_0^a}{\sqrt{\varepsilon_{eff}}} \quad (5)$$

The total air-filled capacitance $C_t^a$ per unit length and the filling factors $q_1$, $q_2$ and $q_3$ can be found in terms of the partial capacitances of each layer. The partial capacitance of each of the n air-filled layers is given by $$C_n = 2\varepsilon_0 \frac{K(k_n)}{K(k_n')} \quad (6)$$

where $\varepsilon_0$ is the permittivity of free space; K(k) are the complete elliptical integrals of the first kind; and the values for $k_n$ are given by:

$$k_1 = \frac{w}{w + 2s} \quad (7)$$

$$k_2 = \frac{\sinh\left(\frac{\pi w}{4h_2}\right)}{\sinh\left(\frac{\pi(w+2s)}{4h_2}\right)}$$

$$k_3 = \frac{\tanh\left(\frac{\pi w}{4h_3}\right)}{\tanh\left(\frac{\pi(w+2s)}{4h_3}\right)}$$

and the complementary values $k_n' = \sqrt{1 - k_n^2}$.

Now considering a non-conductor backed CPW system with all dielectrics replaced with air, it is apparent from symmetry that the total capacitance of this system would be the sum of the capacitances from each side of the electrodes $C_t^a = 2C_1^a$ and that the filling factor for each side must then be $$q = \frac{C_1^a}{C_t^a} = 0.5. \quad (8)$$

Next considering a CPW with a finite thickness dielectric backing suspended in air, the effective dielectric constant for such a system is $\varepsilon_{eff} = 1 + 0.5(\varepsilon_r - 1)C_2^a/C^a/C_1 = (1 - q_m) + \varepsilon_r q_m$. Inspection of this equation leads to the conclusion that $$q_m = 0.5 \frac{C_2^a}{C_1^a} = \frac{C_2^a}{C_t^a} \quad (9)$$

where $q_m$ denotes the filling factor of the main CPW dielectric base layer. Since equation (9) is based on the idea of a dielectric base layer surrounded by air (a dielectric) it should also be valid for the boundary between any two dielectrics. Hence, generalising, for the case in FIG. 5, $q_m = q_2$. Written specifically:

$$q_2 = \frac{C_2^a}{C_t^a} \quad (10)$$

From equations (8) and (9), and the filling factor boundary condition that $$q_1 + q_2 + q_3 = 1 \quad (11)$$

it follows that $$q_1 = \frac{C_1^a - C_2^a}{C_t^a} \quad (12)$$

Now reintroducing the conductor backing and considering the CBCPW air filled system, it is apparent that the total capacitance will simply be the sum of the capacitances for the tool layer and the air layer (assuming $h_2 \to 0$). Explicitly:

$$C_t^a = C_1^a + C_3^a \quad (13)$$

and the filling factor of layer 3 ($q_3$) (equivalent to the rock layer 39 in FIG. 5) is simply the ratio of the total capacitance to the capacitance in layer 3, i.e.

$$q_3 = \frac{C_3^a}{C_t^a} \quad (14)$$

The foregoing explains the manner in which filling factors q are calculated. The filling factors q are used in the calculation of dielectric constant values of the layers 21, 38 and 39 of FIG. 5 when the sensor 21 is energized by a network analyzer such as a vector network analyzer.

If the method of the present disclosure gives rise to a single depth of investigation signal it is possible to correct the measured dielectric constant values for the dielectric constant of the sensor 21, and in such a case it is not possible to determine the dielectric constant of the rock 39 separately from that of the borehole surface layer 38 which may be mudcake and/or near borehole fluid mixing. Again as previously stated, the borehole may be rugose or smooth.

If as described further below the method involves two depths of investigation, one penetrating the borehole surface (e.g. mudcake) layer 38 and the rock 39 and the other penetrating the mudcake layer 38 but significantly less of the rock 39 it becomes possible to establish the permittivity of the rock independently of the permittivity value of the mudcake.

Dual depth of investigation results may be obtained e.g. by providing two sensors 21 of non-identical designs and energizing or otherwise operating them sequentially in order to obtain information about differing depths of penetration of the electrical energy supplied to them into the rock 39.

Figure 6:
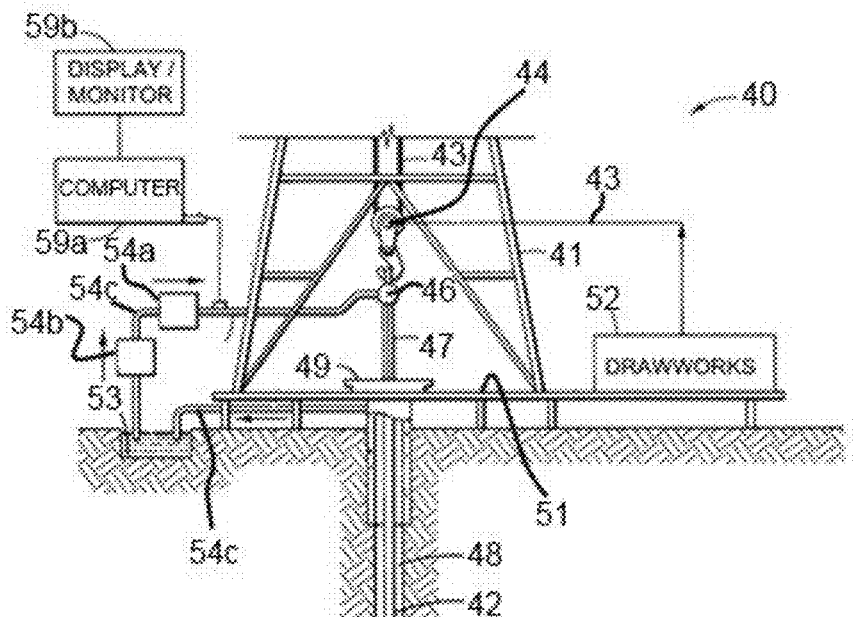
FIG. 6 shows an exemplary logging-while-drilling (LWD) arrangement being one example of use of apparatus according to the present disclosure.

FIG. 6 shows an LWD arrangement in which the apparatus is of utility. The subject matter of the present disclosure also may be used in other situations in which logging is performed; and it is not necessary that the logging activity takes place in conjunction with drilling as illustrated. Furthermore the equipment may take a range of forms other than that shown; the borehole 48 shown in FIG. 6 need not extend vertically or even generally downwards as illustrated; and the equipment need not be land-based, with the apparatus and method of the present disclosure being equally applicable e.g. in offshore situations.

In FIG. 6, a land-based drilling rig 40 includes a derrick 41 of a per se known kind supporting a drillstring 42 by way of a drill line 43 acting via a travelling block 44, swivel 46 and kelly drive 47 all of which may be of conventional designs. The drill string extends along a borehole 48 for a distance that may be several hundred or thousand meters.

The kelly drive 47 acts via a rotary table 49 set in a drill floor 51 that also supports a motor, drill line drum and ancillary parts 52 referred to sometimes as drawworks.

Drilling mud is circulated as indicated by arrows from a mud pit 53 between the drillstring 42 and borehole 48 by way of per se known pump 54a, filter 54b and pipework 54c components. The pipework connects to the borehole 48 via schematically shown unions at the swivel 46 and rotary table 49, also in a per se known manner.

At its downhole end inside the borehole, the drillstring terminates in one or more drill bits or cutters 56. These may adopt a range of designs including but not limited to the exemplary one illustrated. Rotary drive in use of the drilling rig 40 is transferred from e.g. the motor of the draw works 52 via a chain or shaft drive to the rotary table 49 that by way of keyed engagement with the kelly drive 47 effects rotation of the drillstring 42. This in turn causes cutting of rock at the downhole end of the borehole 48. Cuttings resulting from this action are conveyed in the circulating drilling mud to the mud pit 53, where they settle for later recovery or treatment. The filter 54b prevents thus removed cuttings from being conveyed to the drill bit 56 unless an injection of cuttings is required (in which case the filter 54b may be temporarily bypassed or disconnected from the pipework 54c).

Between the drill bit 56 and the remainder of the drillstring 42, a plurality of logging sondes or subs constituting a logging tool 57 are connected in an in-line fashion.

In the embodiment shown in FIG. 6, three subs 27a, 27b, 27c are illustrated that may be respectively a sensor sub 57a, a vector network analyzer sub 57b and a telemetry sub 57c. The subs 57a, 57b, 57c may be considered as defining a logging tool. It is not, however, that any logging tool falling within the scope of the present disclosure adopts the configuration illustrated in FIG. 6; and considerable variation is possible.

The sensor sub may include supported on its outer periphery one or more sensors 58 of apparatuses according to the present disclosure as described herein. When embodied as a wireline logging tool, as opposed to the illustrated LWD logging tool, the sensors may be mounted on one or more extensible arms that permit deployment of the sensor(s) from a stowed position e.g. flush with the outer surface of the sub 57a to a deployed position in which the sensor(s) is/are pressed into engagement with the wall of the borehole 48. This defines with any borehole surface layer 48 and the rock 39 surrounding it a three-layer system of the kind illustrated schematically in FIG. 5.

In other embodiments of the present disclosure lacking extensible arms, the diameter of the sub 57a may be sufficient to cause contact of the or each sensor 58 with the wall of the borehole 48 in a manner that gives rise to a multi-layer system similar to that of the three-layer system of FIG. 5. A further possibility is for the sensor 58 to be mounted on an outer surface of the cylinder of the logging tool 57; and for the logging tool 57 to include on its side opposite the sensor one or more calipers or similar mechanical devices that are deployable to press the sensor 58 into intimate contact with the wall 12 of the borehole 48 thereby replicating the multi-layer dielectric system exemplified in FIG. 5, which as noted is a multi-layer system the number of layers of which depends on whether intermediate layers such as mudcake or a borehole fluid filled rugose surface have formed.

Embodiments of the logging tool of the present disclosure that include plural sensors typically (but not necessarily) would include the plural sensors disposed at intervals about the outer periphery of the sensor sub 57a. The latter normally would be cylindrical, as is conventional in logging tool subs. In many examples the sensors if present as a plurality would be spaced at equal intervals about the periphery, but this need not be the case and various irregular spacings are possible within the scope of the present disclosure.

In such an arrangement, the plural sensors could all be located at the same distance along the sub 57a, whereby they would all log essentially the same borehole depth. In other embodiments of the present disclosure, however, it is not necessary for all the sensors of a plurality to exist at the same borehole depth in use of the logging apparatus.

The sub 57b in the preferred embodiment shown in FIG. 6 houses a vector network analyzer (VNA). Details of such a device are known to the person of skill in the art and do not require a detailed description herein.

VNA devices vary greatly in their designs. One form includes two connector cables that connect to respective ends of a SUT by way of terminating connectors. The resistances of the cables and ancillary parts of the VNA must be carefully controlled and balanced in order to provide for accurate measurements.

A VNA is capable of detecting the transmission and reflectance characteristics, and among other quanta in particular the S-Parameter characteristics (or other reflection and transmission characteristics, as noted herein), of a SUT. The VNA of sub 57b has its connector cables connected respectively at each end of the sensor 58, details of which are provided below. As noted the VNA may be modular or may be constituted as a number of components that are distributed in the logging tool 57.

The telemetry sub 57c may contain an electronics section that conditions signals generated in the VNA for transmission. In the arrangement shown in FIG. 6 such signals are transmitted via one of a number of known methods to a programmable device 59 in the form of a computer 59a and monitor 59*b* located adjacent the derrick 41. In other embodiments of the present disclosure, the programmable device may be located and/or configured differently and may be for instance constituted by a series of control components that are non-modular. In some embodiments of the present disclosure, the programmable device may form part of the logging tool 57, and this may be of benefit e.g. in LWD applications of the technology of the present disclosure.

Regardless of its precise construction, one function of the programmable device is to generate log information derived from the output of the VNA. This activity is described in more detail below. The log information once generated may exist as numerical, graphical, tabular or text-based information that may be displayed via the monitor 59*b*, stored e.g. in the programmable device 59 or elsewhere, transmitted, printed, analyzed or processed in accordance with techniques that will be familiar to workers of skill in the data logging art.

Figure 7:
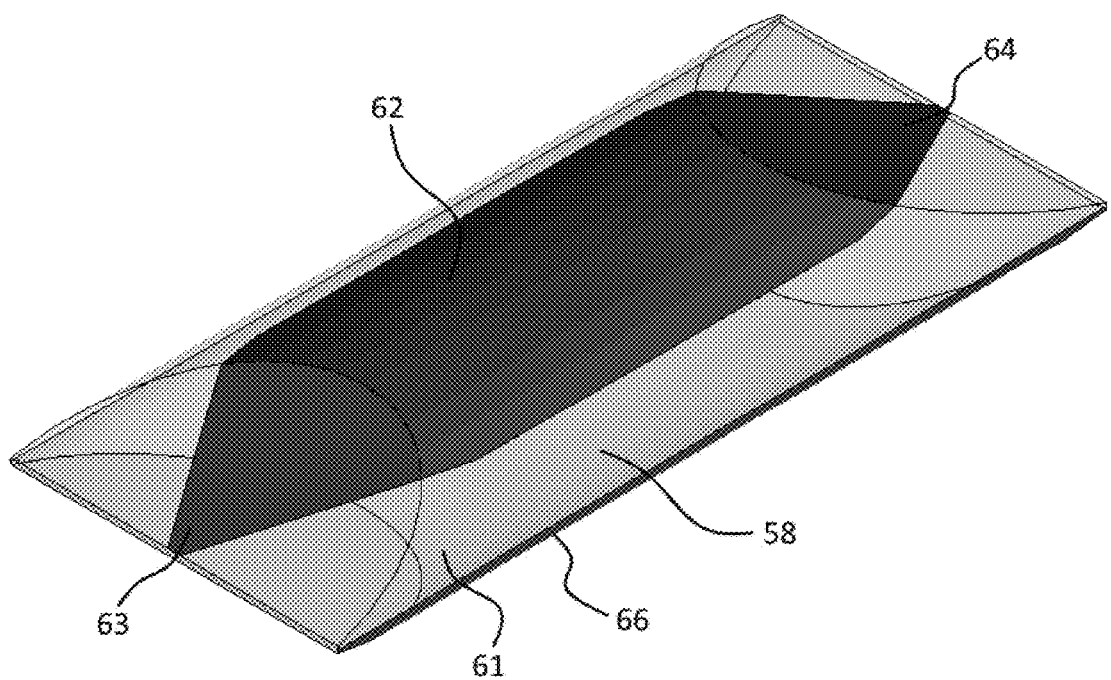
FIG. 7 shows a modified form of non-flat waveguide-based sensor according to the present disclosure.

Referring now to FIG. 7, one form of the sensor 58 is illustrated. As noted the logging tool 57 may include one or a plurality of the sensors 58, depending on the precise design.

Sensor 58 comprises a substrate 61 formed of a dielectric material. The substrate 61 is elliptical in cross-section allowing better conformity with the borehole wall than a flat sensor.

Circular or part-circular profile sensing and rear surfaces also are viable from the standpoint of signal penetration. It furthermore is believed that surface profiles that are blends of different curves are likely to produce acceptable or good results. Some examples of sensor designs of elliptical and part-elliptical profiles are described below with reference to the various FIG. 9 hereof.

A curved, parallel-sided conducting line 62 is fixed on the sensing surface of the sensor 58. The cables of the network analyzer are connected at connectors 63, 64 that extend from the faces at either end of the sensor 58. The rear face of the sensor is formed with a conducting ground electrode 66 that wraps part-way onto the sensing surface whereby the sensor 58 may be modelled as the sensor design shown in FIG. 5 with a respective conducting ground plane element 66 flanking each elongate edge of the conducting line 62.

As is well known, a network analyzer operates in one mode by electrically energizing a SUT via the cables and detecting the waveform of electrical energy transmitted through and reflected by the SUT.

It is desirable for the sensor 58 to be designed such that when held in air it transmits the maximum amount of signal with little or no reflected power. Any in-use, i.e. downhole, change in transmission and reflection characteristics can then be attributed to the influence of an external dielectric material and not an artefact of the sensor itself. The sensor should therefore be designed such that when it is held in air the characteristic impedance at each point along the sensor is at or close to a known reference impedance, usually the impedance of the network analyzer and associated feed cables. Any abrupt changes in physical dimensions of the sensor must also be avoided as these can also cause unwanted reflections.

In order to avoid these unacceptable reflection characteristics, therefore, the material of the conducting line 62 tapers between the parallel-sided conducting line section 62 and the connectors 63, 64. This taper is chosen such that the characteristic impedance at each point along the device is maintained at or close to a constant value, usually the reference impedance of the network analyzer.

One drawback of this design is that the influence of an external dielectric material will not change the impedance of the sensor uniformly along its length, but instead provide a graded impedance change along the tapered sections of the sensor. This can make interpretation of the results difficult.

Figure 8:
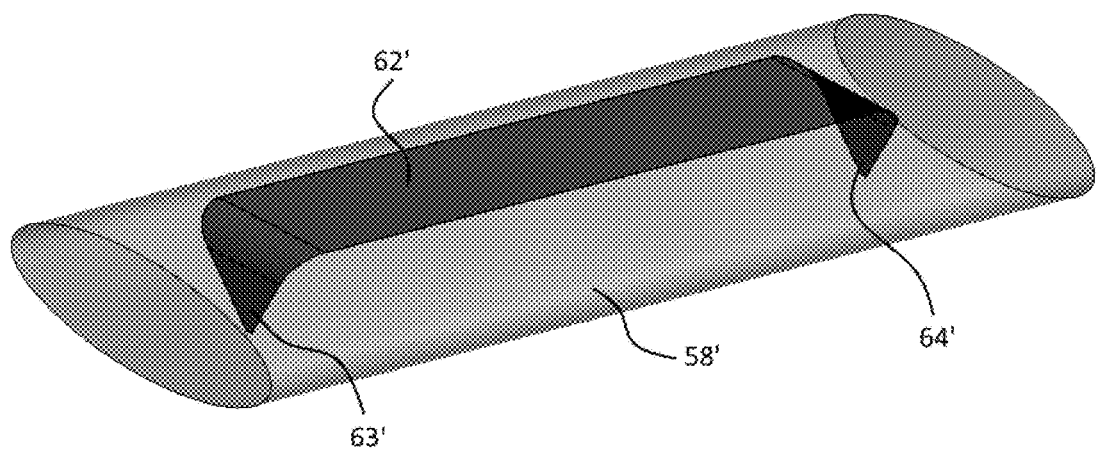
FIG. 8 shows another modified, non-flat waveguide-based sensor that is presently the most preferred embodiment of sensor according to the present disclosure.

Sensor 58' of FIG. 8 is similar to sensor 58 of FIG. 7, but the design of the conducting line 62' differs from that of conducting line 62. In particular the connectors 63', 64' are orientated at 90 degrees to the parallel-sided conducting line 62. This tends to reduce the graded impedance change when the sensor is in the proximity of a dielectric material. In turn this makes interpreting the resulting transmission and reflection characteristics easier.

Other impedance values may be adopted, depending on the precise application of the sensor and its geometry and materials of manufacture.

Each terminal portion of the tapered portion 69 terminates in a point at which one of the connectors of the VNA is conductingly connected.

The illustrated arrangement of the sensor 58' provides advantages because unwanted reflections are well controlled, yet the measurement region is well defined.

The tapered ends 69 of the conducting line 62' act as a balun, the characteristics of which are known to a person of skill in the art of electronic non-destructive testing and circuit design.

FIGS. 10*a*-10*f* show a number of alternative non-flat sensor profile designs, according to the present disclosure, that are believed to be effective in testing for dielectric constant values of rock in a multi-layer dielectric system of the general kind exemplified by FIG. 5.

Figure 9A:
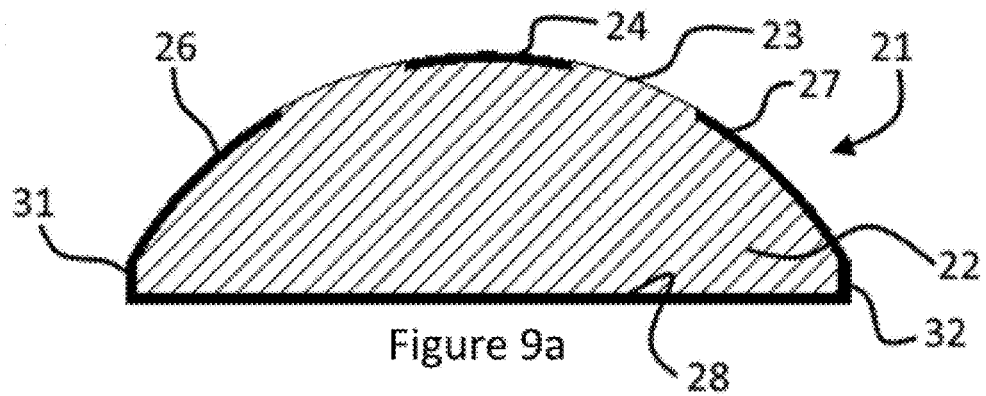
FIGS. 9a-9f show in schematic, cross-sectional view numerous non-flat conducting line sensor profile variants falling within the scope of the present disclosure.

The profile in FIG. 9*a* essentially is that of the sensor 21 of FIG. 5. Thus the substrate 22 of the sensor 21 is essentially of D-profile, with a convexly curved, centrally extending conducting line 24 secured on the convexly curved upper (as shown in FIG. 9*a*) side 23 of the substrate.

A conducting earth plane 28 is placed on the reverse side of the substrate 22 and extends around sides 31, 32 of the substrate to encroach on the front convex face 23 of the sensor 22. This defines earth planes 26, 27 which are spaced from conducting line 24 and extend parallel to and spaced from it. The spacing of each earth plane 26, 27 from conducting line 24 is constant and is the same on each side of the conducting line 24.

Figure 9B:
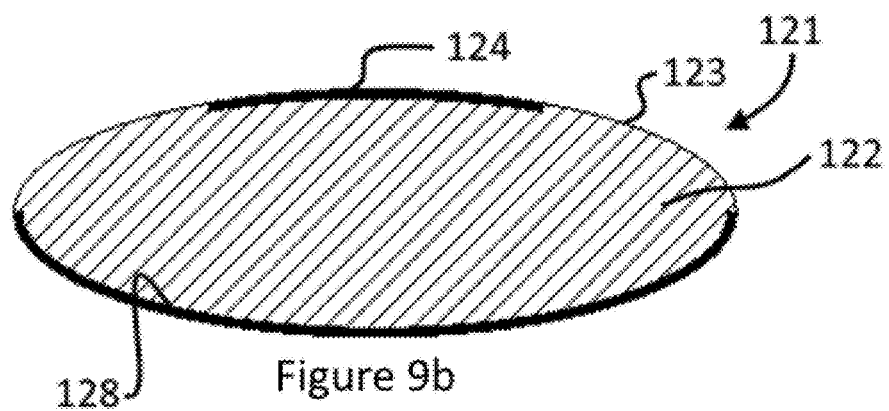

The variant sensor 121 of FIG. 9*b* includes a substrate 122 of fully elliptical cross-section. The conducting line 124 and gaps 123 are similar to conducting line 24 and gaps 23 of FIG. 9*a*, but in the embodiment of FIG. 9*b* they are wider to encourage the electric field to extend further and facilitate a deeper depth of investigation.

Figure 9C:
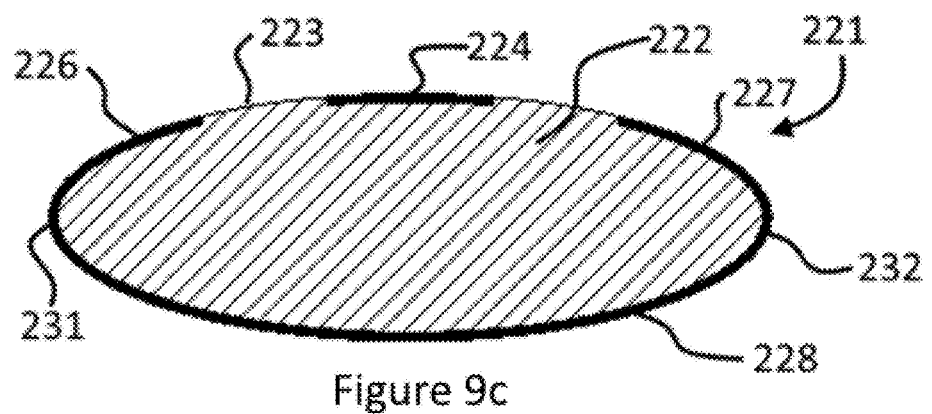

The sensor 221 of FIG. 9*c* may be regarded as a fully elliptical equivalent of the FIG. 9*a* sensor. Thus sensor 221 differs from sensor 121 in that the conductor backing 228 extends beyond the half-way point of the ellipse on either side of the cross-section and therefore defines lateral earth planes 226, 227 extending parallel to and on either side of the conducting line 24; and connector electrode portions 231, 232 as illustrated.

Figure 9D:
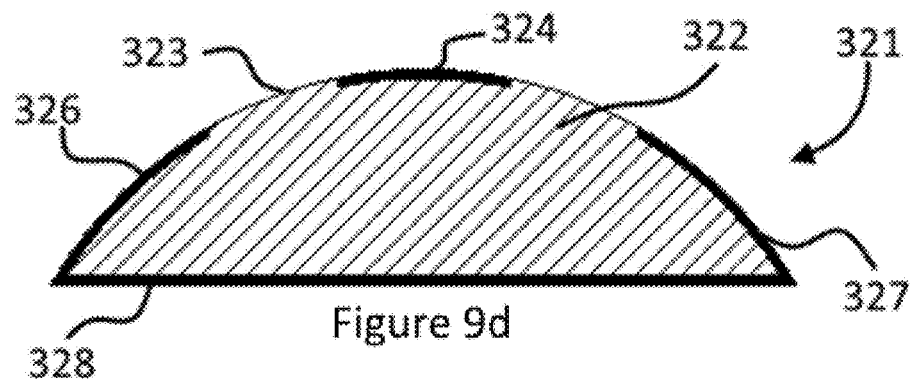

In FIG. 9*d*, a further non-flat sensor variant 321 is shown, in which the substrate 322 is a truncated version of the substrate 21 of FIG. 9*a*. As a result of truncation of the substrate 322, the earth planes 326, 327 of FIG. 9*d* connect directly to the conductor backing 328, without any need for connector electrodes such as electrodes 31, 32 of FIG. 9*a*.

In other respects, the sensor 321 of FIG. 9*d* is similar to sensor 21 of FIG. 9*a*, with a centrally extending conductor electrode 324 secured on the convexly curved upper (as viewed in FIG. 9d) surface 323 of the substrate 322; and with the earth planes 326, 327 extending parallel to and spaced from the conductor electrode 324 on either side.

Figure 9E:
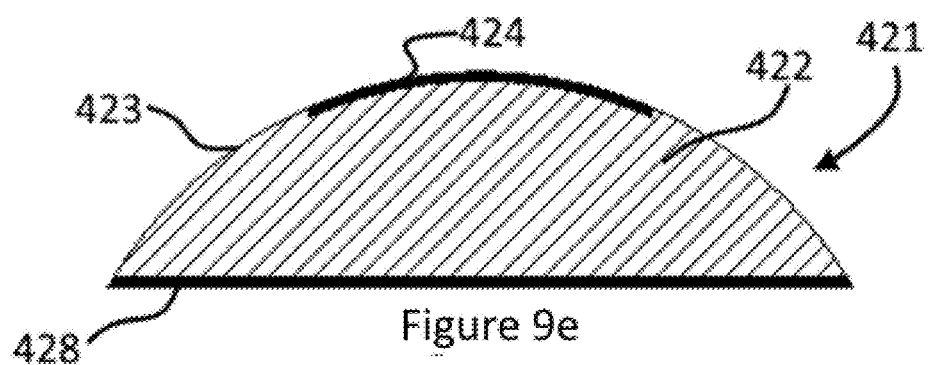

The sensor 421 of FIG. 9e differs from that of FIG. 9d through the omission of the earth planes. In other respects the sensor 421 is the same as sensor 321, with the substrate 422, upper surface 423, conducting line 424 and conductor backing 428 adopting essentially the same forms as in FIG. 9d. In a similar manner to FIG. 9b however the conducting line 424 is wider in FIG. 9e than is the conducting line 324 in FIG. 9d.

Figure 9F:
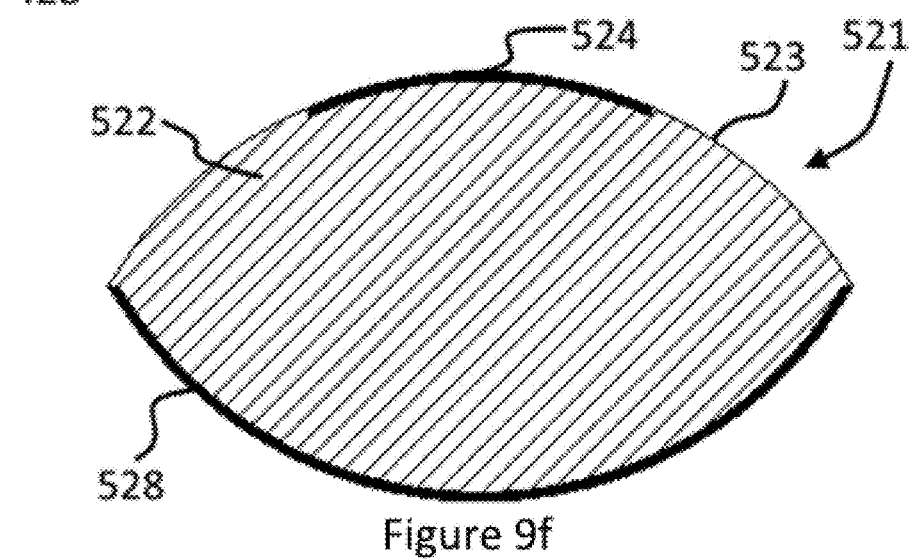

The sensor 521 of FIG. 9f is similar to the sensor 421 of FIG. 9e, except that the rear (as shown, lower) face of the substrate 522 is convexly curved with the result that the conductor backing 528 also is convexly curved.

The sensor examples of FIGS. 9a to 9f are not intended to be limiting, and are merely illustrative of the fact that numerous sensor profiles may be adopted, it being desirable principally that the (as-illustrated, upper) convexly curved surface of the sensor (i.e. the surface supporting the conducting line) is capable of conforming to the profile of a section of borehole wall with a minimal gap. In other words the objective of the practical sensor designs described above primarily is to replicate as closely as possible in a field situation the three-layer system shown in FIG. 5.

Operation of the apparatuses and logging tools described herein involves, firstly, effecting deployment of a sensor according to the present disclosure, typically supported on or forming part of a logging tool, so that it lies juxtaposed to a region of a wall of a borehole extending through a rock formation that it is intended to log. Such deployment may take place during formation of the borehole, as part of an LWD operation. Alternatively it may take place after the borehole has been formed.

In the former case, the logging tool or at least the apparatus defined herein is supported as part of a drill string. In the latter case a variety of deployment methods is possible. Such methods include wireline deployment, drill pipe shuttling, or pumping the logging tool using pressurized borehole fluid such as drilling mud or other liquids. All such techniques and variants thereof are within the scope of the present disclosure.

Following deployment of the apparatus or logging tool (as appropriate), the VNA connected to the sensor may be activated e.g. by sending an electrical activation command if wireline is used to support the logging tool; or by other activation means such as the generation of an activation command in an on-board controller in the case of an autonomous logging tool having its own power supply, the use of one or more pressure pulses generated in borehole fluid or the conveying of a messenger device such as a ball or dart from a surface location along the borehole to engage with an activation member forming part of the logging tool. All such techniques and variants thereof will be known to the person of skill in the art.

Following activation the VNA tests, the SUT represented by the sensor 58 or variants thereof as exemplified in FIGS. 9a to 9f, any mudcake 38 formed on the wall of the borehole and the rock 39 surrounding the borehole. This causes transmission of an electrical field into the rock. By reason of the various design features of the sensor as described herein the penetration of the sensor signal generated by the VNA into the rock is comparable with that of in prior art devices.

The VNA among other activities then analyses the energy reflected by and/or transmitted through the SUT and generates one or more signals that are related to, and hence indicative of, the relative permittivity of the rock.

In more detail in preferred embodiments of the present disclosure, the VNA generates such signals based on the S-Parameter, T-Parameter, Y-Parameter, Z-Parameter, h-Parameter, or ABCD-parameter characteristics of the SUT, in order to calculate the characteristic impedance and hence the relevant relative permittivity of the multi-layer dielectric system comprising the sensor 58, (optionally) the mudcake 38 and the rock 39.

As noted, this may be achieved by modelling the system comprising the apparatus including the sensor 58, the mudcake 38 and the rock 39 as a multi-layer, system each layer of which is characterized by a respective filling factor $q_1$, $q_2$ and $q_3$, which includes the step of calculating the total capacitance as the sum of partial capacitances of each layer Such modelling may take place in or using a programmable device such as device 59.

Use of the apparatus and/or the logging tool of the present disclosure normally would include the step of calculating the effective dielectric constant of the three-layer system based on signals indicative of the S-parameters (or other parameters as explained herein) of the three-layer system and using the expression $\varepsilon_{\mathit{eff}}=\varepsilon_1 q1+\varepsilon_2 q2+\varepsilon_3 q3$ in which $\varepsilon_1 q1$ is the dielectric constant of the sensor 58 multiplied by the relevant filling factor; $\varepsilon_2 q2$ is the dielectric constant of the borehole surface layer which may be mudcake and/or near borehole fluid mixing and/or borehole rugosity 38 multiplied by the relevant filling factor; and $\varepsilon_3 q3$ is the dielectric constant of the rock 39 multiplied by the relevant filling factor for that layer. The programmable device again may be programmed to store and make use of these parameters.

As noted, the borehole surface layer in some cases will not be present. In such instances the calculation method would be modified to take account of the fact that q2 then would have a value of zero.

Various methods exist for deriving the relative permittivity of the rock from the S-Parameter (or other reflection or transmission parameter) measurements generated in the VNA. In a first method, that may be carried into effect using the programmable device 59, propagation factor P for a lossless wave travelling through a CPW is given by:

$$P = \exp\left(-\frac{i\omega L}{c}\sqrt{\mu_r \varepsilon_r}\right). \qquad (15)$$

defining $$\chi = \frac{1 - S_e S_o}{S_e - S_o} \qquad (16)$$

where $S_o$ and $S_e$ are odd and even combinations of the S-parameters thus $$S_e = S_{11} + S_{21}$$

$$S_o = S_{21} - S_{11} \qquad (17)$$

then the reflection coefficient is:

$$\Gamma = \chi \pm \sqrt{\chi^2 - 1} \qquad (18)$$

where the appropriate sign is taken such that $|\Gamma| \leq 1$. The Propagation factor can then be written in terms of the S-parameters thus:

$$P = \frac{S_e - \Gamma}{1 - S_e \Gamma} \quad (19)$$

and two combinations of the relative electric permittivity and magnetic permeability can be written as:

$$\frac{\mu_r}{\varepsilon_r} = \left(\frac{1+\Gamma}{1-\Gamma}\right)^2 = c_1 \quad (20)$$

and $$\mu_r \varepsilon_r = -\left[\frac{c}{\omega L} \ln\left(\frac{1}{P}\right)\right]^2 = c_2 \quad (21)$$

where L is the length of the CPW.

The electric permittivity is then $$\varepsilon_{\it eff} = \sqrt{\frac{c_2}{c_1}}. \quad (22)$$

Alternatively, starting with the odd and even combinations of the S-parameters given in equation (17)

$$\gamma = \frac{4}{L} \tanh^{-1}\left(\sqrt{\frac{1+S_o}{1-S_o} \frac{1-S_e}{1+S_e}}\right) \quad (23)$$

$$Z_{\it eff} = Z_0 \sqrt{\frac{1+S_e}{1-S_e} \frac{1+S_o}{1-S_o}} \quad (24)$$

where $Z_0$ is the reference characteristic impedance of the transmission lines that feed the CPW (often 50Ω). The effective dielectric constant of the CPW/SUT system is then:

$$\varepsilon_{\it eff} = \frac{\mu_0}{4\varepsilon_0} \left(\frac{E}{\Re (Z_{\it eff})}\right)^2 \quad (25)$$

where E is a CPW geometrically dependent factor given by $$E = \left(\frac{K(k_1)}{K(k'_1)} + \frac{K(k_3)}{K(k'_3)}\right)^{-1} \quad (26)$$

These methods may in some circumstances suffer from phase wrapping and instability problems. As a further option it is possible to use numerical methods that may not suffer from such drawbacks. In this regard it is possible to define the S-Parameters using the expressions:

$$S_{11} = \frac{\left[1 - \exp\left(-\alpha - \frac{i\omega L}{c}\sqrt{\varepsilon_r}\right)^2\right]\left[E\sqrt{\frac{\mu_0}{4\varepsilon_0 \varepsilon_r}} - Z_0\right]}{1 - \left[\frac{E\sqrt{\frac{\mu_0}{4\varepsilon_0 \varepsilon_r}} - Z_0}{E\sqrt{\frac{\mu_0}{4\varepsilon_0 \varepsilon_r}} + Z_0}\right]^2 \exp\left(-\alpha - \frac{i\omega L}{c}\sqrt{\varepsilon_r}\right)^2} \quad (27)$$

and $$S_{21} = \frac{1 - \left[\frac{E\sqrt{\frac{\mu_0}{4\varepsilon_0 \varepsilon_r}} - Z_0}{E\sqrt{\frac{\mu_0}{4\varepsilon_0 \varepsilon_r}} + Z_0}\right]^2 \exp\left(-\alpha - \frac{i\omega L}{c}\sqrt{\varepsilon_r}\right)}{1 - \left[\frac{E\sqrt{\frac{\mu_0}{4\varepsilon_0 \varepsilon_r}} - Z_0}{E\sqrt{\frac{\mu_0}{4\varepsilon_0 \varepsilon_r}} + Z_0}\right]^2 \exp\left(-\alpha - \frac{i\omega L}{c}\sqrt{\varepsilon_r}\right)^2} \quad (28)$$

These two equations can be solved simultaneously via numerical methods for the parameters $\varepsilon_r$ and $\alpha$.

All such method steps can be carried into effect using the programmable device 59 which, as mentioned, may take a variety of forms within the scope of the present disclosure.

The programmable device 59, or a further programmable device, is in accordance with the preferred embodiment of the method caused to generate one or more logs based on signals generated in the vector network analyzer. Logs may take a variety of forms. Broadly, one may consider a log to be a collection of data values or visual indicators recorded at differing locations in a borehole, the locations resulting from sequential recording techniques whereby the collection of values or indicators corresponds to differing borehole depths and/or differing azimuthal positions about the circumference of the borehole.

Furthermore, the sensor 58 is capable of analyzing rock 39 surrounding the borehole selectively relatively deeply and relatively shallowly with respect to the borehole; and the method of the present disclosure optionally includes effecting deep and shallow measurements using the sensor or apparatus including it; and calculating a compensated dielectric constant value using the deep and shallow measurements.

For the avoidance of doubt, the method of the present disclosure typically includes the step of drawing a logging tool along the borehole. This may be effected e.g. by withdrawing or pushing a drill pipe or wireline that supports the logging tool 57, in a per se known manner. Logging measurements as described above may be taken periodically as the logging tool 57 progresses towards a surface or downhole location.

The methods as defined herein as mentioned may include the step of saving, printing, storing, transmitting or displaying the one or more logs, or discrete values of dielectric constant, that result from operation of apparatus as defined herein.

The disclosed subject matter in addition is considered to reside in one or more programmable devices that is programmed to carry out the various signal and data processing steps explained in the foregoing sections.

The disclosed subject matter also extends to a drill string including apparatus as described above or a logging tool also as described above; and/or to log data generated using apparatus or a logging tool as defined herein or through operation of methods as defined herein.

Preferences and options for a given aspect, feature or parameter of the disclosed subject matter should, unless the context indicates otherwise, be regarded as having been disclosed in combination with any and all preferences and options for all other aspects, features, and parameters of the disclosed subject matter.

The listing or discussion of an apparently prior-published document in this specification should not necessarily be taken as an acknowledgement that the document is part of the state of the art or is common general knowledge.

What is claimed is:

1. An apparatus for determining permittivity in a downhole location, the apparatus comprising:
   a transmission line sensor including:
      a waveguide transmission line comprising an elongate conducting line supported on or adjacent a first side of a dielectric substrate and that is capable of juxtaposition to a downhole borehole wall, and
      at least a first conducting ground element supported on or adjacent the dielectric substrate and being spaced from the elongate conducting line; and
   a measuring device, defining first and second ports, that is capable of energizing the transmission line sensor and of detecting one or more signal reflection and/or transmission characteristics relating to electrical current and/or electrical voltage,
   wherein the waveguide transmission line defines first and second ends that are each connectable to a respective one of the first and second ports of the measuring device.

2. The apparatus according to claim 1, wherein the measuring device includes one or more of an impedance analyser, a voltage measuring device, a current measuring device, a vector network analyser, and a scalar network analyser.

3. The apparatus according to claim 1, wherein the reflection and/or transmission characteristics are or include one or more characteristics selected from the list including voltage, current, S-Parameter characteristics, Z-Parameter characteristics, Y-Parameter characteristics, h-Parameter characteristics, ABCD-Parameter characteristics or T-parameter characteristics of the system including the sensor.

4. The apparatus according to claim 1, wherein the measuring device is capable of energizing the transmission line sensor in a range of frequencies.

5. The apparatus according to claim 1, wherein the transmission line sensor comprises a non-flat stripline, a non-flat coplanar waveguide, or a non-flat microstrip.

6. The apparatus according to claim 1, wherein the transmission lines sensor includes the elongate conducting line on a side of a dielectric core material of the dielectric substrate; and wherein the dielectric core material includes a conducting earth plane supported on or adjacent a reverse side of the dielectric core material.

7. The apparatus according to claim 1, wherein the transmission line sensor includes the elongate conducting line on a side of a dielectric core material of the dielectric substrate; wherein the dielectric core material includes a conducting earth plane supported on or adjacent a reverse side of the dielectric core material; and wherein the conducting earth plane extends around respective, opposed parts of the transmission line sensor as the at least one first conducting ground element to flank each elongate edge of the elongate conducting line and thereby define a respective, predefined gap between the edges of the elongate conducting line and the conducting earth plane.

8. The apparatus according to claim 1, including a plurality of the transmission line sensors each capable of investigating the borehole environment to a differing depth of investigation, the apparatus further including one or more of the measuring devices that are connectable to measure signals corresponding to the differing depths.

9. The apparatus according to claim 1, wherein the transmission line sensor comprises a coplanar waveguide having a further conducting ground element supported on a second side of the dielectric substrate lying opposite the first side.

10. The apparatus according to claim 1, wherein the transmission line sensor comprises a coplanar waveguide having a further conducting ground element supported on a second side of the dielectric substrate lying opposite the first side; and wherein the further conducting ground plane element is conductingly connected respectively at each side to a pair of the first conducting ground plane elements.

11. The apparatus according to claim 1, wherein the elongate conducting line tapers at each of the first and second ends by way of a tapered portion between a transmission line portion and a respective terminal portion, respective terminals of the first and second ports of the measuring device being connected to the respective terminal portions.

12. The apparatus according to claim 1, wherein the elongate conducting line tapers at each of the first and second ends by way of a tapered portion between a transmission line portion and a respective terminal portion, respective terminals of the first and second ports of the measuring device being connected to the respective terminal portions; and wherein the elongate conducting line tapers uniformly between the transmission line portion and each terminal portion.

13. The apparatus according to claim 1, wherein the elongate conducting line tapers at each of the first and second ends by way of a tapered portion between a transmission line portion and a respective terminal portion, respective terminals of the first and second ports of the measuring device being connected to the respective terminal portions; and wherein the conducting line tapers and the substrate dimensions change such that the impedance at each point along the tapered portion is maintained at or close to a constant value.

14. The apparatus according to claim 1, wherein the elongate conducting line tapers at each of the first and second ends by way of a tapered portion between a transmission line portion and a respective terminal portion, respective terminals of the first and second ports of the measuring device being connected to the respective terminal portions; and wherein the tapered portion comprises a balun.

15. The apparatus according to claim 1, wherein the first side of the dielectric substrate is convexly curved.

16. The apparatus according to claim 1, wherein the first side of the dielectric substrate is convexly curved; and wherein a profile of the first side of the dielectric substrate is part-elliptical or part-circular.

17. The apparatus according to claim 1, wherein the transmission line sensor comprises a coplanar waveguide having a further conducting ground element supported on a second side of the dielectric substrate lying opposite the first side; and wherein the second side of the dielectric substrate is convexly curved.

18. The apparatus according to claim 1, wherein the transmission line sensor comprises a coplanar waveguide having a further conducting ground element supported on a second side of the dielectric substrate lying opposite the first side; wherein the second side of the dielectric substrate is convexly curved; and wherein a profile of the second side of the dielectric substrate is part-elliptical or part-circular.

19. The apparatus according to claim 1, wherein the measuring device is connected to one or more programmable devices programmed to generate log information derived from the output of the measuring device.

20. The apparatus according to claim 1, including two or more sensor arrangements of differing physical dimensions, lengths, and/or orientations.

21. The apparatus according to claim 1, wherein the measuring device includes a plurality of electrical and/or electronic components some or all of which are supported by or incorporated in the transmission line sensor.

22. The apparatus of claim 1, comprising a logging tool including the transmission line sensor and the measuring device according to claim 1.

23. The apparatus according to claim 22, including at least one moveable arm that is secured at one end to the logging tool and supports the transmission line sensor at its opposite end.

24. The apparatus according to claim 22, wherein the measuring device is supported in or by the logging tool.

25. The apparatus according to claim 22, wherein the logging tool is operatively connected to a programmable device that is programmed to generate one or more logs based on signals measured by the measuring device.

26. The apparatus according to claim 22, wherein the logging tool is operatively connected to a programmable device that is programmed to generate one or more logs based on signals measured by the measuring device; and wherein the programmable device is spaced from the logging tool and is connected thereto by wireline.

27. The apparatus according to claim 22, wherein the logging tool is operatively connected to a programmable device that is programmed to generate one or more logs based on signals measured by the measuring device; and wherein the programmable device is supported in or on the logging tool.

28. The apparatus of claim 1, comprising a logging tool including a plurality of the transmission line sensor and the measuring device each according to claim 1.

29. The apparatus according to claim 20, including a plurality of the transmission line sensor and the measuring device each according to claim 1, wherein the logging tool includes an outer periphery; and wherein the plurality of the sensor and the measuring device is supported at intervals about the outer periphery.

30. The apparatus according to claim 20, including: a plurality of the transmission line sensor and the measuring device each according to claim 1; and a plurality of moveable deployment members that are capable of moving respective ones of the transmission line sensors between a stowed position and a deployed, protruding position.

31. The apparatus according to claim 22, wherein the logging tool is supported on and operatively connected to wireline.

32. The apparatus according to claim 22, including an on-board power source.

33. A method of determining permittivity in a borehole, the method comprising:

(i) effecting juxtaposition to a downhole borehole wall of a transmission line sensor forming part of an apparatus according to claim 1 or forming part of a logging tool according to claim 22;
(ii) causing the measuring device to detect one or more signal reflection and/or transmission characteristics of the sensor using the measuring device; and
(iii) generating one or more signals indicative of the relative permittivity of the rock in which the borehole is formed.

34. The method according to claim 33, wherein the signal reflection and/or transmission characteristics are or include one or more characteristics selected from the list comprising voltage, current, S-parameter characteristics, Z-Parameter characteristics, Y-Parameter characteristics, h-Parameter characteristics, ABCD-Parameter characteristics or T-parameter characteristics.

35. The method according to claim 33, wherein the signal reflection and/or transmission characteristics are or include one or more characteristics selected from the list comprising voltage, current, S-parameter characteristics, Z-Parameter characteristics, Y-Parameter characteristics, h-Parameter characteristics, ABCD-Parameter characteristics or T-parameter characteristics and wherein the one or more signals are or include signals representative of the characteristic impedance of the sensor of the apparatus according to claim 1 when forming part of a two or more dielectric system under test in which the sensor defines a first dielectric layer and rock surrounding a borehole defines a second dielectric layer.

36. The method according to claim 33, wherein the signal reflection and/or transmission characteristics are or include one or more characteristics selected from the list comprising voltage, current, S-parameter characteristics, Z-Parameter characteristics, Y-Parameter characteristics, h-Parameter characteristics, ABCD-Parameter characteristics or T-parameter characteristics; wherein the one or more signals are or include signals representative of the characteristic impedance of the sensor of the apparatus according to claim 1 when forming part of a two or more dielectric system under test in which the sensor defines a first dielectric layer and rock surrounding a borehole defines a second dielectric layer; and wherein the one or more signals are or include signals representative of the characteristic impedance of the sensor of the apparatus of any of claims 1 to 21 when forming part of a three-dielectric system under test in which a borehole wall (as defined herein) additionally defines a third dielectric layer.

37. The method according to claim 33, including the step of determining the filling factors of the layers of a multilayer dielectric system.

38. The method according to claim 33, wherein the signal reflection and/or transmission characteristics are or include one or more characteristics selected from the list comprising voltage, current, S-parameter characteristics, Z-Parameter characteristics, Y-Parameter characteristics, h-Parameter characteristics, ABCD-Parameter characteristics or T-parameter characteristics; and wherein the one or more signals are or include signals representative of the characteristic impedance of the sensor of the apparatus according to claim 1 when forming part of a two or more dielectric system under test in which the sensor defines a first dielectric layer and rock surrounding a borehole defines a second dielectric layer; including the step of determining, based on signals indicative of the S-parameters of the two-layer system, the effective dielectric constant of the two-layer system and using the expression $\varepsilon_{eff} = \varepsilon_1 q_1 + \varepsilon_3 q_3$ in which $q_1$, and $q_3$ are respective filling factors of the layers of the system and $\varepsilon_1$ is the dielectric constant of the sensor of the apparatus of any of claims 1 to 21 to establish $\varepsilon_3$ which is the dielectric constant of the second dielectric layer.

39. The method according to claim 33, wherein the signal reflection and/or transmission characteristics are or include one or more characteristics selected from the list comprising voltage, current, S-parameter characteristics, Z-Parameter characteristics, Y-Parameter characteristics, h-Parameter characteristics, ABCD-Parameter characteristics or T-parameter characteristics; and wherein the one or more signals are or include signals representative of the characteristic impedance of the sensor of the apparatus according to claim 1 when forming part of a two or more dielectric system under test in which the sensor defines a first dielectric layer and rock surrounding a borehole defines a second dielectric layer; including the step of determining, based on signals indicative of the S-parameters of a three-layer system, the effective dielectric constant of the three-layer system and using the expression $\varepsilon_{\mathit{eff}} = \varepsilon_1 q_1 + \varepsilon_2 q_2 + \varepsilon_3 q_3$ in which $q_1$, $q_2$ and $q_3$ are respective filling factors of the layers of the system and $\varepsilon_1$ is the dielectric constant of the sensor of the apparatus of any of claims 1 to 20 to establish, as necessary, $\varepsilon_2$ which is the dielectric constant of the first dielectric layer; and $\varepsilon_3$ which is the dielectric constant of the second dielectric layer.

40. The method according to claim 33, wherein the signal reflection and/or transmission characteristics are or include one or more characteristics selected from the list comprising voltage, current, S-parameter characteristics, Z Parameter characteristics, Y-Parameter characteristics, h-Parameter characteristics, ABCD-Parameter characteristics or T-parameter characteristics; and wherein the one or more signals are or include signals representative of the characteristic impedance of the sensor of the apparatus according to claim 1 when forming part of a two or more dielectric system under test in which the sensor defines a first dielectric layer and rock surrounding a borehole defines a second dielectric layer; including the step of determining, based on signals indicative of the S-parameters of a three-layer system, the effective dielectric constant of the three-layer system and using the expression $\varepsilon_{\mathit{eff}} = \varepsilon_1 q_1 + \varepsilon_2 q_2 + \varepsilon_3 q_3$ in which $q_1$, $q_2$ and $q_3$ are respective filling factors of the layers of the system and $\varepsilon_1$ is the dielectric constant of the sensor of the apparatus of any of claims 1 to 20 to establish, as necessary, $\varepsilon_2$ which is the dielectric constant of the first dielectric layer; and $\varepsilon_3$ which is the dielectric constant of the second dielectric layer and including the step of operating the apparatus of any of claims 1 to 21 at plural depths of investigation.

41. The method according to claim 33, wherein the signal reflection and/or transmission characteristics are or include one or more characteristics selected from the list comprising voltage, current, S-parameter characteristics, Z-Parameter characteristics, Y-Parameter characteristics, h-Parameter characteristics, ABCD-Parameter characteristics or T-parameter characteristics and including the step of causing a programmable device to generate one or more logs based on signals measured by the measuring device.

42. The method according to claim 33, including the step of causing movement of a logging tool along the borehole.

43. The method according to claim 33, including the step of causing movement of a logging tool along the borehole and including supporting the logging tool using and connected via wireline.

44. The method according to claim 33, when carried out during drilling of a borehole.

45. The method according to claim 33, when carried out during drilling of a borehole and including the step of saving, printing, storing, transmitting or displaying the one or more logs.

46. The method according to claim 33, including the step of causing the measuring device to energise the sensor.

47. The method according to claim 33, including the step of causing the measuring device to energise the sensor and including the step of energizing the sensor in a range of frequencies.

48. A programmable device that is programmed to carry out the steps of the method of claim 33.

49. The apparatus of claim 1, further comprising a drill string including the sensor and measuring device according to claim 1.

50. The apparatus of claim 22, further comprising a drill string including the logging tool according to claim 22.

* * * * *